(12) United States Patent
Cai et al.

(10) Patent No.: US 12,518,723 B2
(45) Date of Patent: Jan. 6, 2026

(54) METHOD FOR CONTROLLING VSYNC SIGNAL, ELECTRONIC DEVICE, STORAGE MEDIUM, AND CHIP

(71) Applicant: Honor Device Co., Ltd., Shenzhen (CN)

(72) Inventors: Lifeng Cai, Shenzhen (CN); Long Cheng, Shenzhen (CN); Hongyan Du, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/862,821

(22) PCT Filed: Aug. 24, 2023

(86) PCT No.: PCT/CN2023/114759
§ 371 (c)(1),
(2) Date: Nov. 4, 2024

(87) PCT Pub. No.: WO2024/066834
PCT Pub. Date: Apr. 4, 2024

(65) Prior Publication Data
US 2025/0285602 A1    Sep. 11, 2025

(30) Foreign Application Priority Data
Sep. 30, 2022  (CN) .......................... 202211211815.5

(51) Int. Cl.
*G09G 5/00* (2006.01)
*G06F 1/3218* (2019.01)
*G09G 5/18* (2006.01)

(52) U.S. Cl.
CPC .............. *G09G 5/18* (2013.01); *G06F 1/3218* (2013.01); *G09G 2310/08* (2013.01); *G09G 2340/0435* (2013.01); *G09G 2360/08* (2013.01)

(58) Field of Classification Search
CPC ..... G06T 1/20; G06T 15/005; G06T 2210/36; G06T 2200/28; G06T 2200/04;
(Continued)

(56) References Cited

U.S. PATENT DOCUMENTS

2008/0174606 A1* 7/2008 Rengarajan ............ G09G 5/003
345/531
2018/0260095 A1* 9/2018 Peng ....................... G06F 9/451
(Continued)

FOREIGN PATENT DOCUMENTS

| CN | 109474768 A | 3/2019 |
| CN | 113766324 A | 12/2021 |

(Continued)

*Primary Examiner* — Insa Sadio
(74) *Attorney, Agent, or Firm* — Slater Matsil, LLP

(57) ABSTRACT

Embodiments of the present disclosure relate to a method for controlling a Vsync signal, an electronic device, a storage medium, and a chip. The method includes: A synthesis system receives a Vsync signal request message sent by a main thread of an application. After receiving the Vsync signal request message, the synthesis system determines a number of rendering times of a rendering thread of the application in unit time. When the number of rendering times of the rendering thread in unit time is equal to the system refresh rate of an electronic device, a Vsync thread sends a Vsync signal to the main thread of the application at a first frequency, and the first frequency is equal to the system refresh rate.

8 Claims, 9 Drawing Sheets

(58) Field of Classification Search
CPC ............. G09G 2330/021; G09G 5/363; G09G 2320/0626; G09G 5/18; G09G 2360/06; G09G 2360/08; G06F 1/3212; G06F 1/3293; H04N 21/42653; H04N 21/4302
See application file for complete search history.

(56) References Cited

U.S. PATENT DOCUMENTS

| | | |
|---|---|---|
| 2020/0005702 A1 | 1/2020 | Peng et al. |
| 2020/0005736 A1 | 1/2020 | Peng et al. |
| 2022/0060607 A1 | 2/2022 | Huang |
| 2022/0351679 A1 | 11/2022 | Yang et al. |
| 2023/0282162 A1 | 9/2023 | Gao et al. |
| 2024/0357201 A1 | 10/2024 | Feng et al. |

FOREIGN PATENT DOCUMENTS

| | | |
|---|---|---|
| CN | 114205673 A | 3/2022 |
| CN | 114661263 A | 6/2022 |
| WO | 2021143676 A1 | 7/2021 |
| WO | 2022105484 A1 | 5/2022 |

* cited by examiner

METHOD FOR CONTROLLING VSYNC SIGNAL, ELECTRONIC DEVICE, STORAGE MEDIUM, AND CHIP

CROSS-REFERENCE TO RELATED APPLICATIONS

This application is a National Stage of International Application No. PCT/CN2023/114759, filed on Aug. 24, 2023, which claims priority to Chinese Patent Application No. 202211211815.5, filed on Sep. 30, 2022, both of which are hereby incorporated by reference in their entireties.

TECHNICAL FIELD

Embodiments of the present disclosure relate to the technical field of terminal display, and in particular to a method for controlling a Vsync signal, an electronic device, a computer-readable storage medium, and a chip.

BACKGROUND

With the rapid development of display technologies, refresh rates that electronic devices support are also continuously increasing. The refresh rate refers to the number of times that a picture is refreshed per second. At present, to ensure display smoothness of a picture on an electronic device, a refresh rate of the electronic device is usually set to a fixed value, and a high refresh rate is maintained continuously.

However, requirements for the refresh rate are different in different scenarios. If the high refresh rate is uniformly used for display, it may lead to unnecessary resource waste and affect other performance of the device.

Therefore, a solution that can adjust an application refresh rate for different scenarios is expected.

SUMMARY

Embodiments of the present disclosure provide a method for controlling a Vsync signal and apparatus, an electronic device, and a computer-readable storage medium, a main objective of which is to control an application refresh rate by adjusting a Vsync signal transmission frequency for different application scenarios, preventing resource waste, and improving performance of the device.

To achieve the foregoing purpose, in a first aspect, an embodiment of the present disclosure provides a method for controlling a Vsync signal, applied to an electronic device, and including: receiving, by a synthesis system, a Vsync signal request message sent by a main thread of an application; after receiving the Vsync signal request message, determining, by the synthesis system, a number of rendering times of a rendering thread of the application in unit time; when the number of rendering times of the rendering thread in unit time is equal to a system refresh rate of the electronic device, sending, by a Vsync thread, a Vsync signal to the main thread of the application at a first frequency, where the first frequency is equal to the system refresh rate; and when the number of rendering times of the rendering thread in unit time is less than the system refresh rate of the electronic device, sending, by the Vsync thread, the Vsync signal to the main thread of the application at a second frequency, where the second frequency is less than the system refresh rate.

In this way, after receiving the request message from the main thread of the application, the synthesis system compares the number of rendering times of the rendering thread in unit time with the system refresh rate. When the number of rendering times of the rendering thread in unit time is less than the system refresh rate, the Vsync signal transmission frequency of the Vsync thread is reduced, to achieve the purpose of adjusting the refresh rate of the main thread of the application, reducing unnecessary power consumption of the application, preventing resource waste, and improving the performance of the device.

Optionally, the Vsync thread does not send the Vsync signal in at least part of moments, so that the Vsync thread sends the Vsync signal to the main thread of the application at the second frequency; and the at least part of moments is a moment that is determined based on the system refresh rate and in which the Vsync signal needs to be sent. In this way, at the time when the Vsync signal needs to be sent determined based on the system refresh rate, the Vsync thread does not send the Vsync signal, to achieve switching from the first frequency to the second frequency.

Optionally, when the number of rendering times of the rendering thread in unit time is less than 1/n of the system refresh rate, the second frequency is 1/n of the system refresh rate, and n is a positive integer. In this way, when the number of rendering times of the rendering thread in unit time is less than the system refresh rate, a rendering speed is not matched with the system refresh rate, and the main thread of the application does not need to refresh at a high frequency, so that the second frequency can be set to 1/n of the system refresh rate, reducing high-frequency power consumption of the main thread.

Optionally, after receiving the Vsync signal sent at the first frequency or the second transmission frequency, the main thread of the application measures and lays out an image frame; when results of the measurement and the layout meet a preset drawing condition, the main thread of the application triggers the rendering thread to draw and render the image frame; and when results of the measurement and the layout do not meet the preset drawing condition, the main thread of the application does not trigger the rendering thread.

In a second aspect, an embodiment of the present disclosure provides a method for controlling a Vsync signal, applied to an electronic device, including: receiving, by a synthesis system, a Vsync signal request message sent by a main thread of an application; after receiving the Vsync signal request message, determining, by the synthesis system, a number of request times that the main thread of the application sends the Vsync signal request message in unit time; when the number of request times that the main thread of the application sends the Vsync signal request message in unit time is equal to a system refresh rate of the electronic device, sending, by a Vsync thread, a Vsync signal to the main thread of the application at a third frequency, where the third frequency is equal to the system refresh rate; and when the number of request times that the main thread of the application sends the Vsync signal request message in unit time is less than the system refresh rate of the electronic device, sending, by the Vsync thread, the Vsync signal to the main thread of the application at a fourth frequency, where the fourth frequency is less than the system refresh rate.

In this way, after receiving the Vsync signal request message, the synthesis system compares the number of request times that the main thread of the application sends the Vsync signal request message in unit time with the system refresh rate; when the number of request times that the main thread of the application sends the Vsync signal request message in unit time is less than the system refresh rate, the Vsync signal transmission frequency of the Vsync thread is reduced to the fourth frequency that is less than the system refresh rate, thereby adjusting the refresh rate of the main thread of the application and reducing power consumption of the application.

Optionally, the Vsync thread does not send the Vsync signal in at least part of moments, so that the Vsync thread sends the Vsync signal to the main thread of the application at the fourth frequency; and the at least part of moments is a moment that is determined based on the system refresh rate and in which the Vsync signal needs to be sent.

Optionally, when the number of request times that the main thread of the application sends the Vsync signal request message in unit time is less than 1/m of the system refresh rate, the fourth frequency is 1/m of the system refresh rate, and m is a positive integer.

In a third aspect, an embodiment of the present disclosure provides a method for controlling a Vsync signal, applied to an electronic device, including: receiving, by a synthesis system, a Vsync signal request message sent by a main thread of an application; after receiving the Vsync signal request message, determining, by the synthesis system, a layer parameter of an image frame drawn by the main thread of the application; when the layer parameter meets a preset condition, a Vsync thread sends a Vsync signal to the main thread of the application at a fifth frequency, where the fifth frequency is equal to a system refresh rate; and when the layer parameter does not meet the preset condition, the Vsync thread sends the Vsync signal to the main thread of the application at a sixth frequency, where the sixth frequency is less than the system refresh rate.

In this way, when it is determined that the layer parameter of the image frame drawn by the main thread of the application meets the preset condition, the Vsync thread sends the Vsync signal according to a frequency of the system refresh rate; otherwise, the Vsync signal transmission frequency of the Vsync thread is adjusted to the fifth frequency that is less than the system refresh rate. An application refresh rate is adjusted through the Vsync signal transmission frequency, so that resources are saved and the performance of the device is improved.

Optionally, the Vsync thread does not send the Vsync signal in at least part of moments, so that the Vsync thread sends the Vsync signal to the main thread of the application at a sixth frequency; and the at least part of moments is a moment that is determined based on the system refresh rate and in which the Vsync signal needs to be sent.

Optionally, the layer parameter of the image frame includes at least one of a layer area, a layer transparency, a scaling factor, and an application layer identifier.

Optionally, when the layer parameter of the image frame is the layer area, the layer parameter does not meet the preset condition when the layer area of the image frame is less than a first preset value; and the layer parameter meets the preset condition when the layer area of the image frame is greater than or equal to the first preset value.

Optionally, when the layer parameter of the image frame is the layer transparency, the layer parameter does not meet the preset condition when the layer transparency of the image frame is greater than a second preset value; and the layer parameter meets the preset condition when the layer transparency of the image frame is less than or equal to the second preset value.

Optionally, when the layer parameter of the image frame is the scaling factor, the layer parameter does not meet the preset condition when the scaling factor of the image frame is greater than a third preset value; and the layer parameter meets the preset condition when the scaling factor of the image frame is less than or equal to the third preset value.

Optionally, when the layer parameter of the image frame is the application layer identifier, the layer parameter meets the preset condition when the application layer identifier of the image frame belongs to a range of a preset list of perceivable application layers; and the layer parameter does not meet the preset condition when the application layer identifier of the image frame does not belong to the range of the preset list of perceivable application layers.

In this way, according to the determining whether the layer parameter of the image frame drawn by the main thread of the application meet the preset condition, for some layers with small area, high transparency, large scaling factor and the application layer identifier not belonging to the preset list of perceivable application layers, a user is not sensitive to the application refresh rate of the foregoing layers (also known as, the perception experience of the user is weak), but the applications of these layers will continue to send the Vsync signal request messages at a high frequency. For such kind of layers, the Vsync signal transmission frequency of the Vsync thread can be adjusted, to save resources, and ensure performance stability of the main applications.

The first to third aspects of the present disclosure can be used alone or in combination with each other, that is, at least two methods in the first, second and third aspects are combined to control the Vsync signal.

In a fourth aspect, an embodiment of the present disclosure provides an electronic device, including at least one processor; and a memory and a display screen communicatively connected to the at least one processor, where the display screen is configured to display an application interface; and the memory stores instructions executable by the at least one processor, and the instructions, when executed by the at least one processor, cause the at least one processor to perform the foregoing method for controlling a Vsync signal.

In a fifth aspect, an embodiment of the present disclosure provides a computer-readable storage medium, storing computer program instructions, and when the computer program instructions are run on a terminal device, the computer program instructions, when executed by a processor, implement the foregoing method for controlling a Vsync signal.

In a sixth aspect, an embodiment of the present disclosure provides a chip. The chip includes a processor, and the processor is configured to invoke a computer program in a memory to perform the foregoing method for controlling a Vsync signal.

It should be understood that the technical solutions of the fourth aspect to the sixth aspect of the present disclosure correspond to those of the first aspect to the third aspect of the present disclosure respectively, and the beneficial effects obtained by the aspects and the corresponding feasible implementations are similar, and details are not described herein again.

BRIEF DESCRIPTION OF THE DRAWINGS

FIG. 6-1 is a first detailed flowchart of a method for controlling a Vsync signal according to an embodiment of the present disclosure;

FIG. 6-2 is a second detailed flowchart of a method for controlling a Vsync signal according to an embodiment of the present disclosure;

Figure 1:
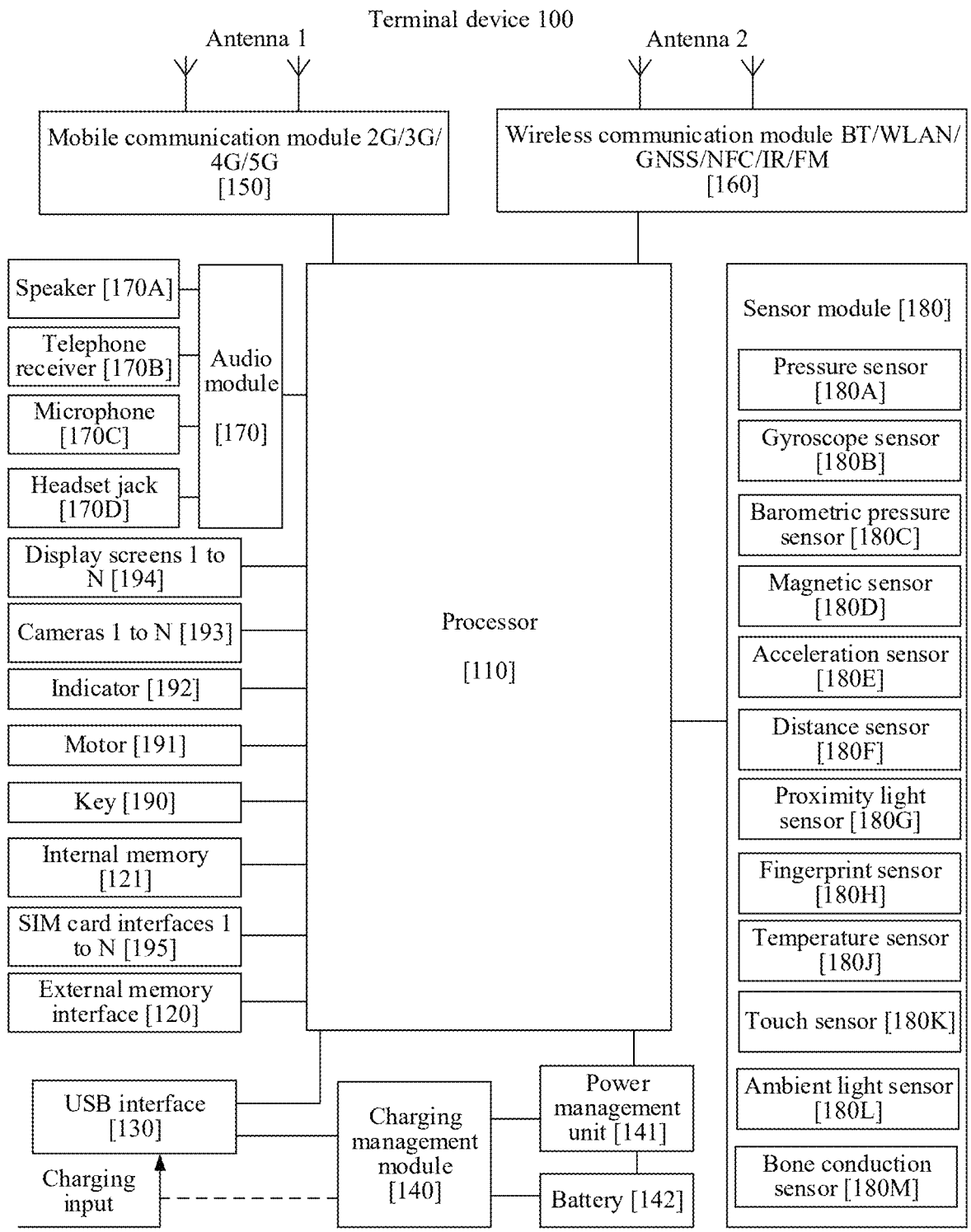
FIG. 1 is a schematic structural diagram of a hardware system of a terminal device according to an embodiment of the present disclosure.

The objective implementation, functional features and advantages of the present disclosure are further illustrated with reference to the accompanying drawings by using the embodiments.

DETAILED DESCRIPTION OF ILLUSTRATIVE EMBODIMENTS

To make the objectives, technical solutions, and advantages of the embodiments of the present disclosure clearer, the following clearly and describes the technical solutions in the embodiments of the present disclosure with reference to the accompanying drawings in the embodiments of the present disclosure. Apparently, the described embodiments are merely some embodiments of the present disclosure rather than all of the embodiments. Based on the embodiments of the present disclosure, an ordinary person skilled in the art can obtain other embodiment(s), without any inventive work, which all should be within the scope of the present disclosure.

When the present disclosure refers to ordinal numbers such as the term "first" or "second", it should be understood that it is only used for distinguishing unless the meaning of order is actually expressed according to the context. The term "exemplarily", "for example" or the like is used for representing giving an example, an illustration, or a description. Any embodiment or design scheme described by using "exemplarily" or "for example" in the present disclosure should not be explained as being more preferred or having more advantages than another embodiment or design scheme. More exactly, the use of words such as "exemplarily" or "for example" is intended to present concepts in a specific manner.

In the embodiments of the present disclosure, "at least one" means one or more, and "a plurality of" means two or more. "And/or" describes an association relationship of associated objects and represents that three relationships may exist. For example, A and/or B may represent as following: only A exists, both A and B exist, and only B exists, where A and B may be singular or plural. The character "/" generally represents that the contextually associated objects are in an "or" relationship. "At least one of the following items" or a similar expression means any combination of these items, including a single item or any combination of a plurality of items. For example, at least one of a, b, or c may represent: a, b, c, a-b, a-c, b-c, or a-b-c, where a, b, and c may be single or multiple.

A method for controlling a Vsync signal provided in the embodiments of the present disclosure may be applied to an electronic device that has a display function.

The electronic device may also be referred to as a terminal (terminal), user equipment (user equipment, UE), a mobile station (mobile station, MS), a mobile terminal (mobile terminal, MT), or the like. The electronic device may be a mobile phone (mobile phone), a smart TV, a wearable device, a tablet computer (Pad), a computer having a wireless transmission and receiving function, a virtual reality (Virtual Reality, VR) electronic device, an augmented reality (augmented reality, AR) electronic device, a wireless terminal in industrial control (industrial control), a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like. The embodiments of the present disclosure impose no limitation on a specific technology and a specific device form used by the electronic device.

To make embodiments of the present disclosure more comprehensible, the following describes a structure of the electronic device in the embodiments of the present disclosure.

Taking an electronic device as a terminal device as an example, FIG. 1 shows a schematic structural diagram of a terminal device 100. The terminal device 100 may include a processor 110, an external memory interface 120, an internal memory 121, a universal serial bus (universal serial bus, USB) interface 130, a charging management module 140, a power management unit 141, a battery 142, an antenna 1, an antenna 2, a mobile communication module 150, a wireless communication module 160, an audio module 170, a speaker 170A, a telephone receiver 170B, a microphone 170C, a headset jack 170D, a sensor module 180, a key 190, a motor 191, an indicator 192, a camera 193, a display screen 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, a proximity light sensor 180G, a fingerprint sensor 180H, a temperature sensor 180J, a touch sensor 180K, an ambient light sensor 180L, a bone conduction sensor 180M, and the like.

It may be understood that the schematic structure in the embodiment of the present disclosure constitutes no specific limitation on the terminal device 100. In some other embodiments of the present disclosure, the terminal device 100 may include more or fewer components than those shown in the figure, or some components may be combined, or some components may be split, or components are arranged in different manners. The components in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU), and the like. Different processing units may be separate devices, or may be integrated into one or more processors.

The controller may generate an operation control signal according to instruction operation code and a time-sequence signal, and control obtaining and executing of instructions.

A memory may also be disposed in the processor 110, configured to store instructions and data. In some embodiments, the memory in the processor 110 is a cache memory. The memory may store instructions or data just used or cyclically used by the processor 110. If the processor 110 needs to use the instruction or the data again, the processor may invoke the instruction or the data from the memory. Repeated access is avoided, and waiting time of the processor 110 is reduced, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor 110 may include a plurality of I2C buses. The processor 110 may be coupled to the touch sensor 180K, a charger, a flash light, the camera 193, and the like by using different I2C bus interfaces respectively. For example, the processor 110 may be coupled to the touch sensor 180K through an I2C interface, so that the processor 110 and the touch sensor 180K communicate through the I2C bus interface, to implement a touch function of the terminal device 100, such as a mobile phone.

The I2S interface may be configured to perform audio communication. In some embodiments, the processor 110 may include a plurality of I2S buses. The processor 110 may be coupled to the audio module 170 through the I2S bus to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be configured to perform audio communication, to sample, quantize, and encode an analog signal. In some embodiments, the audio module 170 may be coupled to the wireless communication module 160 through the PCM bus interface. In some embodiments, the audio module 170 may also transmit the audio signal to the wireless communication module 160 through the PCM interface, to implement the function of answering a call through the Bluetooth headset. Both the I2S interface and the PCM interface can be configured to perform audio communication.

The UART interface is a universal serial data bus and is configured to perform asynchronous communication. The bus may be a bidirectional communication bus. The bus converts data to be transmitted between serial communication and parallel communication. In some embodiments, the UART interface is usually configured to connect the processor 110 to the wireless communication module 160. For example, the processor 110 communicates with a Bluetooth module in the wireless communication module 160 by using a UART interface, to implement a Bluetooth function. In some embodiments, the audio module 170 may transmit the audio signal to the wireless communication module 160 through the UART interface, to implement a function of playing music through the Bluetooth headset.

The MIPI may be configured to connect the processor 110 to a peripheral device such as the display screen 194 or the camera 193. The MIPI interface includes a camera serial interface (camera serial interface, CSI), a display serial interface (display serial interface, DSI), and the like. In some embodiments, the processor 110 communicates with the camera 193 by using the CSI interface, to implement a photographing function of the terminal device 100. The processor 110 communicates with the display screen 194 by using the DSI interface, to implement a display function of the terminal device 100.

A GPIO interface may be configured by software. The GPIO interface may be configured as a control signal, and may also be configured as a data signal. In some embodiments, the GPIO interface may be configured to connect the processor 110 to the camera 193, the display screen 194, the wireless communication module 160, the audio module 170, the sensor module 180, and the like. The GPIO interface may also be configured as an I2C interface, an I2S interface, a UART interface, a MIPI, and the like.

The USB interface 130 is an interface that complies with the USB standard specification, and may be specifically a Mini USB interface, a Micro USB interface, a USB Type C interface, and the like. The USB interface 130 may be configured to be connected to the charger to charge the terminal device 100, or may be configured to perform data transmission between the terminal device 100 and the peripheral device, and may further be configured to be connected to a headset to play audio through the headset. The interface may be further configured to be connected to another electronic device such as an AR device.

It may be understood that a schematic interface connection relationship between the modules in the embodiments of the present disclosure is merely an example for description, and constitutes no limitation on the structure of the terminal device 100. In some other embodiments of the present disclosure, the terminal device 100 may also use an interface connection manner different from that in the foregoing embodiments, or use a combination of a plurality of interface connection manners.

The charging management module 140 is configured to receive charging input from the charger. The charger may be a wireless charger, or may be a wired charger. In some embodiments of wired charging, the charging management module 140 may receive charging input of the wired charger through the USB interface 130. In some embodiments of wireless charging, the charging management module 140 may receive wireless charging input through a wireless charging coil of the terminal device 100. While charging the battery 142, the charging management module 140 may also supply power to the electronic device through the power management module 141.

The power management module 141 is configured to connect the battery 142, the charging management module 140, and the processor 110. The power management module 141 receives an input of the battery 142 and/or the charging management module 140, to supply power to the processor 110, the internal memory 121, the display screen 194, the camera 193, the wireless communication module 160, and the like. The power management module 141 may be further configured to monitor parameters such as a battery capacity, a cycle count of a battery, and a battery health state (leakage and impedance). In some other embodiments, the power management module 141 may also be disposed in the processor 110. In some other embodiments, the power management module 141 and the charging management module 140 may also be disposed in a same device.

A wireless communication function of the terminal device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. An antenna in the terminal device 100 may be configured to cover a single communication frequency band or a plurality of communication frequency bands. Different antennas may also be multiplexed to improve utilization of the antennas. For example, the antenna 1 may be multiplexed into a diversity antenna of a wireless local area network. In some other embodiments, the antennas may be used in combination with a tuning switch.

The mobile communication module 150 can provide a solution for wireless communication including 2G/3G/4G/5G and the like to be applied to the terminal device 100. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering and amplification on the received electromagnetic wave, and transfer the electromagnetic wave to the modem processor for demodulation. The mobile communication module 150 may also amplify a signal modulated by the modem processor, and convert the signal into an electromagnetic wave by using the antenna 1 for radiation. In some embodiments, at least some function modules of the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a low frequency baseband signal to be sent into a medium and high frequency signal. The demodulator is configured to demodulate the received electromagnetic wave signal into a low-frequency baseband signal. Then the demodulator transfers the low-frequency baseband signal obtained through demodulation to the baseband processor for processing. The low-frequency baseband signal is processed by the baseband processor and then transmitted to an application processor. The application processor outputs a sound signal through an audio device (which is not limited to the speaker 170A, the telephone receiver 170B, and the like), or displays an image or a video through the display screen 194. In some embodiments, the modem processor may be a separate device. In some other embodiments, the modem processor may be independent of the processor 110, and is disposed in a same device as the mobile communication module 150 or another function module.

The wireless communication module 160 can provide a solution for wireless communication including wireless local area networks (wireless local area networks, WLAN) (such as a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology and the like to be applied to the terminal device 100. The wireless communication module 160 may be one or more devices into which at least one communication processing module is integrated. The wireless communication module 160 receives an electromagnetic wave by using the antenna 2, performs frequency modulation on the electromagnetic wave signal and filters the electromagnetic wave signal, and sends a processed signal to the processor 110. The wireless communication module 160 may also receive a to-be-sent signal from the processor 110, perform frequency modulation on and amplify the to-be-sent signal, and convert the to-be-sent signal into an electromagnetic wave by using the antenna 2 for radiation.

In some embodiments, in the terminal device 100, the antenna 1 is coupled to the mobile communication module 150, and the antenna 2 is coupled to the wireless communication module 160, so that the terminal device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite based augmentation system (satellite based augmentation systems, SBAS).

The terminal device 100 implements a display function by using the GPU, the display screen 194, the application processor, and the like. The GPU is a microprocessor for image processing and connects the display screen 194 and the application processor. The GPU is configured to perform mathematical and geometric calculations, and is configured to render graphics. The processor 110 may include one or more GPUs that execute a program instruction to generate or change display information.

The display screen 194 is configured to display an image, display a video, receive a slide operation, and so on. The display screen 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a Miniled, a MicroLed, a Micro-oLed, a quantum dot light emitting diode (quantum dot light emitting diode, QLED), and the like. In some embodiments, the terminal device 100 may include one or N display screens 194. N is a positive integer greater than 1.

The terminal device 100 can implement a photographing function by using the ISP, the camera 193, the video codec, the GPU, the display screen 194, the application processor, and the like.

The ISP is configured to process data fed back by the camera 193. For example, during photographing, a shutter is opened, light is transmitted to a camera photosensitive element by using a lens, an optical signal is converted into an electrical signal, and the camera photosensitive element transmits the electrical signal to the ISP for processing, to convert the electrical signal into an image visible to a naked eye. The ISP may also perform algorithm optimization for image noise, brightness, and skin tone. The ISP may also optimize parameters such as exposure and color temperature of a photographed scenario. In some embodiments, the ISP may be disposed in the camera 193.

The camera 193 is configured to capture a static image or video. An optical image is generated for an object by using the lens and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP, to convert the electrical signal into a digital image signal. The ISP outputs the digital image signal to the DSP for processing. The DSP converts the digital image signal into an image signal in a standard RGB, YUV or another format. In some embodiments, the terminal device 100 may include one or N cameras 193, where N is a positive integer greater than 1.

The digital signal processor is configured to process a digital signal, and in addition to processing a digital image signal, the digital signal processor may also process other digital signals. For example, when the terminal device 100 performs frequency channel selection, the digital signal processor is configured to perform Fourier transformation and the like on frequency channel energy.

The video encoder and decoder is configured to compress or decompress a digital video. The terminal device 100 can support one or more video codecs. In this way, the electronic device 100 may play or record videos in a plurality of encoding formats, for example, moving picture experts group (moving picture experts group, MPEG) 1, MPEG 2, MPEG 3, and MPEG 4.

The NPU is a neural-network (neural-network, NN) computing processor that processes input information rapidly by referring to a structure of a biological neural network, for example, by referring to a transmission mode between human brain neurons, and can also perform self-learning continuously. The NPU may be used to implement an application such as intelligent cognition of the electronic device 100, for example, image recognition, facial recognition, voice recognition, and text understanding.

The external memory interface 120 may be configured to be connected to an external storage card such as a micro SD card, to extend a storage capability of the terminal device 100. The external storage card communicates with the processor 110 by using the external memory interface 120, to implement a data storage function. For example, music, video and other files are stored into the external storage card.

The internal memory 121 may be configured to store computer executable program code, where the executable program code includes an instruction. The internal memory 121 may include a program storage area and a data storage area. The program storage area may store an operating system, an application required by at least one function (such as a voice playing function and an image playing function), and the like. The data storage area may store data (such as audio data and an address book) created during use of the terminal device 100, and the like. In addition, the internal memory 121 may include a high-speed random access memory, and may further include a non-volatile memory, for example, at least one disk storage device, a flash memory device, or a universal flash storage (universal flash storage, UFS). The processor 110 executes various functional applications and data processing of the terminal device 100 by running an instruction stored in the internal memory 121 and/or an instruction stored in the memory disposed in the processor.

The terminal device 100 can implement an audio function, for example, music playback and recording, by using the audio module 170, the speaker 170A, the telephone receiver 170B, the microphone 170C, the headset jack 170D, the application processor, and the like.

The audio module 170 is configured to convert digital audio information into analog audio signal output, and is further configured to convert analog audio input into a digital audio signal. The audio module 170 may further be configured to encode and decode audio signals. In some embodiments, the audio module 170 may be disposed in the processor 110, or some function modules in the audio module 170 are disposed in the processor 110.

The speaker 170A, also referred to as "horn", is configured to convert an electrical audio signal into a sound signal. Music can be listened to or a hands-free call can be answered by using the speaker 170A in the terminal device 100.

The telephone receiver 170B, also referred to as "handset", is configured to convert an electrical audio signal into a sound signal. When a call is answered or audio information is listened to by using the terminal device 100, the telephone receiver 170B may be put close to a human ear to listen to a voice.

The microphone 170C, also referred to as "voice tube" or "mike", is configured to convert a sound signal into an electrical signal. When making a call or sending voice information, a user may make a sound approaching the microphone 170C through the mouth of the user, to input a sound signal into the microphone 170C. At least one microphone 170C may be disposed in the terminal device 100. In some other embodiments, two microphones 170C may be disposed in the terminal device 100, to collect a sound signal and further implement a noise reduction function. In some other embodiments, alternatively, three, four, or more microphones 170C may be disposed in the terminal device 100, to collect a sound signal, reduce noise, and further identify a sound source, implement a directional recording function, and the like.

The headset jack 170D is configured to be connected to a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display screen 194. There are many types of pressure sensors 180A, such as a resistive pressure sensor, an inductive pressure sensor, and a capacitive pressure sensor. The capacitive pressure sensor may be a parallel plate including at least two conductive materials. In a case that a force is applied onto the pressure sensor 180A, a capacitance between electrodes changes. The terminal device 100 determines intensity of the pressure based on the change in the capacitance. When a touch operation is applied to the display screen 194, the terminal device 100 detects intensity of the touch operation based on the pressure sensor 180A. The terminal device 100 may also calculate a touch position based on a detection signal of the pressure sensor 180A. In some embodiments, touch operations that are applied to a same touch position but have different touch operation intensity may correspond to different operation instructions.

The gyroscope sensor 180B may be configured to determine a moving posture of the terminal device 100. In some embodiments, an angular velocity of the terminal device 100 around three axes (that is, x, y, and z axes) may be determined through the gyroscope sensor 180B. The gyroscope sensor 180B may be configured to image stabilization during photographing. For example, when the shutter is pressed, the gyroscope sensor 180B detects an angle at which the terminal device 100 jitters, calculates, based on the angle, a distance for which a lens module needs to compensate, and allows the lens to offset the jitter of the terminal device 100 through reverse motion, to implement image stabilization. The gyroscope sensor 180B may further be used in navigation and a motion sensing game scenario.

The barometric pressure sensor 180C is configured to measure a barometric pressure. In some embodiments, the terminal device 100 calculates an altitude by using a barometric pressure value measured by the barometric pressure sensor 180C, to assist in positioning and navigation.

The magnetic sensor 180D includes a Hall sensor. The terminal device 100 may detect opening and closing of a flip leather case by using the magnetic sensor 180D. In some embodiments, when the terminal device 100 is a flip phone, the terminal device 100 may detect opening and closing of a flip cover based on the magnetic sensor 180D. Further, features such as automatic unlocking of the flip cover are set based on the detected opening and closing states of the leather case or opening and closing states of the flip cover.

The acceleration sensor 180E may detect magnitude of accelerations in various directions (generally on three axes) of the terminal device 100. When the terminal device 100 is static, magnitude and a direction of the gravity may be detected. The acceleration sensor may be further configured to recognize a posture of the electronic device, and is applied to switching between landscape orientation and portrait orientation, and applied to an application such as a pedometer.

The distance sensor 180F is configured to measure a distance. The terminal device 100 may measure the distance by using infrared or laser. In some embodiments, in a photographing scenario, the terminal device 100 may use the distance sensor 180F to measure a distance to implement fast focusing.

The optical proximity sensor 180G may include, for example, a light emitting diode (LED) and an optical detector, for example, a photodiode. The light emitting diode may be an infrared light-emitting diode. The terminal device 100 emits infrared light by using the light emitting diode. The terminal device 100 uses a photodiode to detect infrared reflected light from an object nearby. When sufficient reflected light is detected, it may be determined that there is an object near the terminal device 100. When insufficient reflected light is detected, the terminal device 100 may determine that there is no object near the terminal device 100. The terminal device 100 may detect, by using the optical proximity sensor 180G, that the user holds the terminal device 100 close to an ear to make a call, to automatically turn off the screen for power saving. The optical proximity sensor 180G may be further configured to automatically unlock and lock the screen in a leather cover mode and a pocket mode.

The ambient light sensor 180L is configured to perceive ambient light brightness. The terminal device 100 may adaptively adjust brightness of the display screen 194 based on the sensed ambient light brightness. The ambient light sensor 180L may further be configured to automatically adjust white balance during photographing. The ambient light sensor 180L may further cooperate with the optical proximity sensor 180G to detect whether the terminal device 100 is in a pocket to prevent a false touch.

The fingerprint sensor 180H is configured to collect a fingerprint. The terminal device 100 may use a feature of the collected fingerprint to implement fingerprint-based unlocking, accessing an application lock, fingerprint-based photographing, fingerprint-based call answering, and the like.

The temperature sensor 180J is configured to detect temperature. In some embodiments, the terminal device 100 executes a temperature processing policy by using the temperature detected by the temperature sensor 180J. For example, when the temperature reported by the temperature sensor 180J exceeds a threshold, the terminal device 100 lowers performance of a processor located near the temperature sensor 180J, to reduce power consumption to implement thermal protection. In some other embodiments, when the temperature is below another threshold, the terminal device 100 heats the battery 142 to prevent abnormal shutdown of the terminal device 100 caused by the low temperature. In some other embodiments, when the temperature is below still another threshold, the terminal device 100 boosts an output voltage of the battery 142 to prevent abnormal shutdown caused by the low temperature.

The touch sensor 180K is also referred to as a "touch device". The touch sensor 180K may be disposed on the display screen 194. The touch sensor 180K and the display screen 194 form a touchscreen, also referred to as "touch control screen". The touch sensor 180K is configured to detect a touch operation on or near the touch sensor. The touch sensor may transmit the detected touch operation to the application processor to determine a type of the touch event. The touch sensor may provide a visual output related to the touch operation by using the display screen 194. In some other embodiments, the touch sensor 180K may also be disposed on a surface of the terminal device 100 at a position different from that of the display screen 194.

The bone conduction sensor 180M may obtain a vibration signal. In some embodiments, the bone conduction sensor 180M may obtain a vibration signal of an acoustic portion vibrating bone of a human body. The bone conduction sensor 180M may further come into contact with a human pulse to receive a blood pressure pulse signal. In some embodiments, the bone conduction sensor 180M may also be disposed in the headset, to combine into a bone conduction headset. The audio module 170 may parse out a voice signal based on the vibration signal of the acoustic portion vibrating bone that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or a touch-type button. The terminal device 100 may receive key input, generate key signal input related to a user setting and function control of the terminal device 100.

The motor 191 may generate a vibration prompt. The motor 191 may be configured to provide an incoming call vibration prompt, and may further be configured to provide a touch vibration feedback. For example, touch operations applied to different applications (for example, photographing and audio playback) may correspond to different vibration feedback effects. The motor 191 may further correspond to different vibration feedback effects for touch operations applied to different areas of the display screen 194. Different application scenarios (for example, a time reminder, information receiving, an alarm clock, and a game) may further correspond to different vibration feedback effects. Customization of a touch vibration feedback effect may also be supported.

The indicator 192 may be an indicator light that may be configured to indicate a charging state and a power change, or may further be configured to indicate a message, a missed call, a notification, and the like.

The SIM card interface 195 is configured to be connected to a SIM card. The SIM card may be inserted into the SIM card interface 195 or plugged from the SIM card interface 195 to come into contact with or be separated from the terminal device 100. The terminal device 100 may support one or N SIM card interfaces. N is a positive integer greater than 1. The SIM card interface 195 can support a Nano SIM card, a Micro SIM card, a SIM card, and the like. A plurality of cards may be inserted into a same SIM card interface 195 at the same time. Types of the plurality of cards may be of a same type or different types. The SIM card interface 195 may further be compatible with different types of SIM cards. The SIM card interface 195 may further be compatible with an external memory card. The terminal device 100 interacts with a network by using the SIM card, to implement a call function, a data communication function, and the like. In some embodiments, the electronic device 100 uses an eSIM, that is, an embedded SIM card. The eSIM card may be embedded into the terminal device 100, and cannot be separated from the terminal device 100.

A software system of the terminal device 100 may use a layered architecture, an event driven architecture, a micro core architecture, a micro service architecture, or a cloud architecture. In the embodiments of the present disclosure, an Android system with a layered architecture is used as an example to illustrate a software structure of the terminal device 100.

Figure 2:
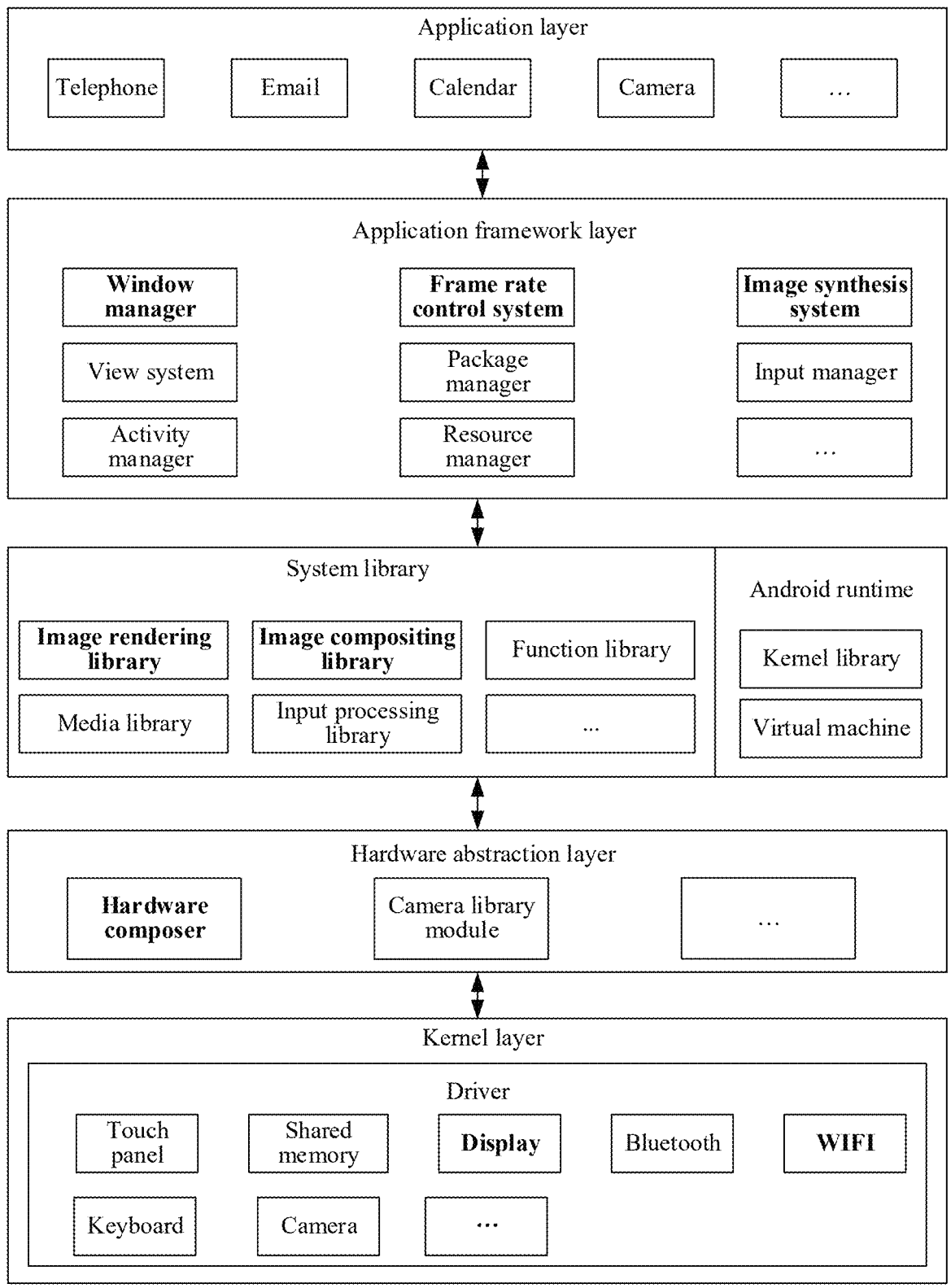
FIG. 2 is a schematic structural diagram of a software system of a terminal device according to an embodiment of the present disclosure.

FIG. 2 is a block diagram of a software structure of an electronic device according to an embodiment of the present disclosure.

Software is divided into several layers by a hierarchical architecture, and each layer has a clear role and task. The layers communicate with each other through a software interface. In some embodiments, the Android system is divided into five layers, namely, an application layer, an application framework layer, an Android runtime (Android runtime) and system library, a hardware abstraction layer and a kernel layer from top to bottom. In the following description, a "process" may have a plurality of "threads", and a "thread" may only belong to one process.

The application layer may include a series of application packages.

As shown in FIG. 2, the application package may include telephone, email, calendar, camera and other applications, and each application may execute the corresponding application process.

The application framework layer provides an application programming interface (application programming interface, API) and a programming framework for the applications at the application layer. The application framework layer includes some predefined functions.

As shown in FIG. 2, in some implementations, the application framework layer may include a window manager, a frame rate control system, an image synthesis system (synthesis system for short), a view system, a package manager, an input manager, an activity manager, a resource manager and the like.

The window manager is configured to manage a window application. The window manager may obtain a size of a display screen, determine whether there is a status bar, perform screen locking, take a screenshot of the screen, and the like.

The frame rate control system is configured to adjust a screen refresh rate of the electronic device.

The synthesis system is configured to control image synthesis, and generate a Vsync (vertical synchronization, Vsync) signal.

The synthesis system includes: a synthesis thread, a Vsync thread and a queue buffer (quene buffer) thread. The synthesis thread, also referred to as a SurfaceFlinger thread (SF thread), is configured to be awakened by a Vsync signal for synthesis. The Vsync thread is configured to generate a next Vsync signal according to the Vsync signal. The queue buffer thread is configured to store buffer, generate a Vsync signal request and wake up the synthesis thread.

The view system includes visual controls such as a control for displaying a text and a control for displaying an image. The view system may be configured to construct an application. A display interface may include one or more views. For example, a display interface including a short message notification icon may include a view for displaying a text and a view for displaying an image.

The packet manager is configured to perform program management in the system, for example, application installation, uninstall, upgrade, and the like.

The input manager is configured to manage a program of an input device. For example, the input system may determine input operations such as a mouse click operation, a keyboard input operation and touch sliding.

The activity manager may be configured to manage a lifecycle of each application and a navigation fallback function, and is responsible for creation of a main thread of Android and maintenance of the life cycle of each application.

The resource manager provides various resources such as a localized character string, an icon, an image, a layout file, and a video file for an application.

The Android runtime includes a kernel library and a virtual machine. The Android runtime is responsible for scheduling and managing the Android system.

The core library may include two parts: one part is a performance function that the Java language needs to invoke, and the other part is a core library of Android.

The application layer and the application framework layer run on the virtual machine. The virtual machine executes Java files of the application layer and the application framework layer as binary files. The virtual machine is used to execute functions such as object lifecycle management, stack management, thread management, security and exception management, and garbage collection.

The system library may include a plurality of function modules. For example, an image rendering library, an image compositing library, a function library, a media library and an input processing library.

The image rendering library is configured to render two-dimensional or three-dimensional images. The image synthesis library is configured to synthesize two-dimensional or three-dimensional images.

In possible implementations, an application draws and renders an image through the image rendering library, and then the application sends a drawn and rendered image to a queue buffer of the synthesis system. When a Vsync signal arrives, the synthesis system (for example, surfaceflinger) obtains a to-be-synthesized image frame from the buffer queue in sequence, and then performs image synthesis through the image synthesis library.

The function library provides macros, type definitions, string manipulation functions, mathematical computation functions, input and output functions, and the like used in C language.

The media library supports playback and recording of a plurality of common audio and video formats, a static image file, and the like. The media library may support a plurality of audio and video encoding formats, such as MPEG4, H.264, MP3, AAC, AMR, JPG, and PNG.

The input processing library is configured to process a library of an input device, which can realize mouse, keyboard and touch input processing, and the like.

The hardware abstraction layer may include a plurality of library modules, the library modules, for example, may be a hardware composition thread (hwcomposer, HWC), a camera library module, and the like. The Android system may load the corresponding library module for device hardware, and then realize the purpose of accessing the device hardware by the application framework layer. The device hardware may include, for example, an LCD display screen, a camera and the like in an electronic device.

The kernel layer is a layer between hardware and software. The kernel layer at least includes a touch panel (touch panel, TP) driver, a display driver, a Bluetooth driver, a WIFI driver, a keyboard driver, a shared memory driver, a camera driver and the like.

The hardware may be an audio device, a Bluetooth device, a camera device, a sensor device, and the like.

With reference to a scenario in which an application starts or interface switching occurs in the application, the following exemplarily describes a working process of software and hardware of the terminal device 100.

When the touch sensor 180K in the touch panel receives an external touch operation, the kernel layer processes the touch operation into an original input event (including information such as touch coordinates, touch strength, and a time stamp of the touch operation). The original input event is stored at the kernel layer. The kernel layer reports the original input event to the input manager of the application framework layer through the input processing library. The input manager of the application framework layer parses information of the original input event (including: an operation type and a report position, and the like) and determine a focus application according to a current focus, and send parsed information to the focus application. The focus may be a touch point of the touch operation or a click position of the mouse click operation. The focus application is an application running in a foreground of the electronic device or an application corresponding to a touch position of the touch operation. The focus application determines a control corresponding to the original input event according to the parsed information of the original input event (for example, a report position).

Taking the touch operation as a touch sliding operation, and the control corresponding to the touch sliding operation as a list control of WeChat® application as an example, the WeChat® application invokes the image rendering library in the system library to draw and render the image through the view system in the application framework layer. The WeChat® application sends the drawn and rendered image to the queue buffer of the synthesis system. The drawn and rendered image in the synthesis system is synthesized into a WeChat® interface by using the image synthesis library in the system library. The synthesis system makes a screen (display screen) display the corresponding interface of the WeChat® application through the display driver of the kernel layer.

For ease of understanding, some of the examples are given to illustrate concepts related to the embodiments of the present disclosure for reference.

1. A "user interface (user interface, UI)" is a medium interface for interaction and information exchange between an application or an operating system and a user. The user interface implements conversion between an internal form and a form acceptable to the user of information. UID (user identifier) represents user identification or a user identification number. The user interface is source code written in a specific computer language such as java and extensible markup language (extensible markuplanguage, XML). The interface source code is parsed and rendered on an electronic device, and is finally presented as content that can be recognized by the user. A commonly used expression form of the user interface is a graphic user interface (graphical user interface, GUI), referring to a user interface that is graphically displayed and related to computer operations. The user interface may be a visual interface element displayed in the display screen of the electronic device, such as a text, an icon, a button, a menu, a tab, a text box, a dialog box, a status bar, a navigation bar and a Widget.

2. A frame rate (frame rate) is also referred to as a frame velocity, and the unit of which is the number of frames per second, recorded as FPS. The frame rate refers to the number of picture frames generated by a graphics card (that is, GPU) in the unit of one second, that is, the number of the pictures that the graphics card can render and send for display per second. For example, the frame rate may be set to 30 FPS, 60 FPS, or the like. Since the multi-frame static images are rapidly and continuously displayed to form a dynamic picture, the greater the frame rate of a video, the better the coherence of the picture. A smoother and more realistic picture can be obtained due to the high frame rate. The more frames per second, the smoother a displayed action, and thus the better the picture texture. It should be noted that the interface display frame of the electronic device usually goes through the processes of drawing, rendering and synthesizing.

3. A screen refresh rate is the number of times that a screen can be refreshed every second, and the unit of which is Hertz (Hz). For example, a 60 Hz screen means that the screen can be refreshed 60 times within 1 second. Similarly, a 120 Hz screen means that the screen can be refreshed 120 times within 1 second, so the higher the refresh rate, the more frames the screen can display. Accordingly, the lower the picture delay, the higher the smoothness.

During a process that a user uses the electronic device, when the refresh rate and frame rate of the display are not synchronized, for example, when there are many frames per second (for example, 90 FPS or 120 FPS) and the refresh rate is low (for example, 30 Hz), there will be a picture freezing, and even a tearing effect of screen dislocation.

4. A Vsync signal is used to synchronize the refresh rate and the frame rate of the display, to avoid the tearing effect of the screen.
5. A synthesizer, namely, an image synthesizer, can further integrate image frame data sent by the synthesis system, send the data to the display driver, and send it to the screen for display through the display driver.

The following describes a general image drawing and display process. In the Android (Android) system, the image drawing and display process is collaboratively completed by a software side, a display driver integrated circuit (display driver integrated circuit, DDIC) and a display screen. On the software side, firstly, a page is refreshed by an application (application, App), and then layer synthesis is performed on a drawn layer by SurfaceFlinger to obtain image data. Then, the image data is sent to the hardware compositing module (HWC, hwcomposer) and the display driver, and then sent (written) to DDIC for display through a mobile industry processor interface (mobile industry processor interface, MIPI). The DDIC stores the image data sent by the software side for display in a buffer (buffer), and controls the display screen (such as OLED or LCD) to complete switching of the refresh rate by scanning (reading) the image data in the buffer. The display screen refreshes and displays (display) the image.

In a high refresh rate display scenario, the software side generates image data at a high frequency. Accordingly, the display screen side performs high frequency image refresh according to the image data, thus improving the smoothness of the image. That is to say, both the layer drawing and rendering performed by App and the layer synthesis performed by SurfaceFlinger are controlled by a Vsync period. The Vsync period determines a change speed of the image displayed on the screen after the user performs a click or sliding operation on the screen.

In addition, because human eyes are sensitive to moving objects, a high screen refresh rate is needed in various dynamic display scenarios. For example, when some applications use UI threads to perform background tasks in a background, the working frequency of the application has nothing to do with user experience because drawing and rendering are not involved. If the application works at a high refresh rate, power consumption of the application may be increased, and resources may be wasted. In addition, when a foreground process has a high refresh rate working frequency, a background task also has a high refresh rate. When there are a plurality of APP scenarios in the current background, it may lead to resource waste of a system on a chip, causing a weak perception process in the background or foreground to seize CPU/GPU/DDR resources in the foreground, which not only wastes power, but also affects the performance of the device.

Therefore, in the embodiment of the present disclosure, when the electronic device wants to display the scenario normally, the current screen refresh rate can be switched to the normal screen refresh rate to meet high frame rate display requirements. If the current application does not need to perform rendering, or belongs to the weak perception process in the background or foreground, the purpose of adjusting the refresh rate of the application can be achieved by adjusting the Vsync signal transmission frequency, which reduces unnecessary power consumption, not only does not affect the user experience, but also improves the performance of the whole device.

Based on this, the embodiment of the present disclosure provides a method for controlling a Vsync signal, which controls the Vsync signal transmission frequency of the Vsync thread by identifying non-perceptual applications, background applications and other applications that do not need to perform high-frequency refresh, to control the application refresh frequency, achieving the purpose of reducing unnecessary power consumption of the application thread, optimizing the load of the device, and ensuring that tasks performed by the foreground can use system resources first.

Figure 3:
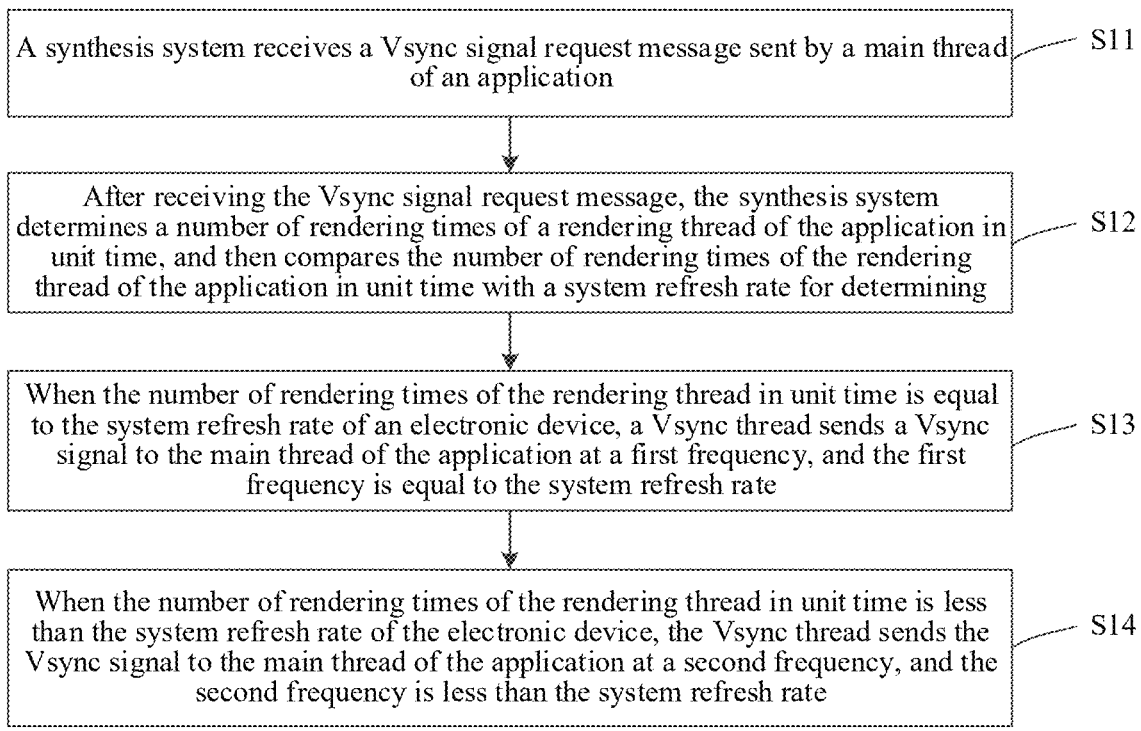
FIG. 3 is a flowchart of a method for controlling a Vsync signal according to an embodiment of the present disclosure.

Exemplarily, FIG. 3 shows a flowchart of a method for controlling a Vsync signal according to an embodiment of the present disclosure.

As shown in FIG. 3, the method for controlling a Vsync signal according to the embodiment of the present disclosure includes the following steps:

S11: A synthesis system receives a Vsync signal request message sent by a main thread of an application.

S12: After receiving the Vsync signal request message, the synthesis system determines a number of rendering times of a rendering thread of the application in unit time, and then compares the number of rendering times of the rendering thread of the application in unit time with a system refresh rate for determining.

S13: When the number of rendering times of the rendering thread in unit time is equal to the system refresh rate of an electronic device, a Vsync thread sends a Vsync signal to the main thread of the application at a first frequency, and the first frequency is equal to the system refresh rate.

S14: When the number of rendering times of the rendering thread in unit time is less than the system refresh rate of the electronic device, the Vsync thread sends the Vsync signal to the main thread of the application at a second frequency, and the second frequency is less than the system refresh rate.

Exemplarily, since the second frequency is less than the first frequency, when adjusting the Vsync signal transmission frequency of the Vsync thread, the Vsync thread may not send the Vsync signal in at least part of moments, so that the Vsync thread switches to the second frequency from the first frequency to send the Vsync signal to the main thread of the application, and the at least part of moments is a moment that is determined based on the system refresh rate and in which the Vsync signal needs to be sent. In other words, at the time when the Vsync signal needs to be sent determined based on the system refresh rate, the Vsync signal transmission frequency can be reduced by choosing not to send the Vsync signal. Specifically, the Vsync thread does not send a number of the Vsync signals, that is, the number of skipped Vsync signals, and determines a specific value of the second frequency.

In some implementations of the present disclosure, after receiving the Vsync signal request message, the synthesis system determines the number of rendering times of the rendering thread of the application in unit time (as the number of rendering times for short). When the number of rendering times of the rendering thread in unit time is less than the system refresh rate of the electronic device, the synthesis system can set a timer, and monitor a time point (a time point when the Vsync signal needs to be sent determined based on the system refresh rate) by the timer, when the next Vsync signal arrives, and does not send the Vsync signal at the next time point, so that the Vsync thread sends the Vsync signal to the main thread of the application at the second frequency.

The value of the second frequency can be adjusted according to the number of the Vsync signals that Vsync thread does not send or the number of times that the Vsync thread does not send the Vsync signal, that is, the Vsync thread skips at least one Vsync signal and does not send it. When the Vsync thread does not send the Vsync signal, the main thread of the application cannot measure, lay out and draw the image frame according to the Vsync signal, thus preventing the main thread of the application from waking up the rendering thread for unnecessary drawing of the image frame.

In addition, when the number of rendering times of the rendering thread in unit time is equal to the system refresh rate of the electronic device, the Vsync thread can send the Vsync signal to the main thread of the application at the system refresh rate, and the main thread of the application measures and lays out the image frame according to the Vsync signal. When results of the measurement and the layout meet a preset drawing condition, the main thread of the application triggers the rendering thread to draw and render the image frame. When results of the measurement and layout do not meet the preset drawing conditions, the main thread of the application does not trigger the rendering thread.

In a specific implementation of the present disclosure, the synthesis system adjusts the Vsync signal transmission frequency of the Vsync thread by setting the timer. The duration of one cycle of the timer can be set based on the system refresh rate of the electronic device. When setting time of the timer expires, the synthesis system can wake up the main thread of the application to draw the corresponding image frame based on the Vsync signal generated by the Vsync thread, and a drawn image frame is synthesized by the synthesis system for display by a terminal. Otherwise, by setting the timer again, the synthesis system can adjust the refresh rate of the application while waiting for the arrival of the next Vsync signal, until the Vsync signal transmission frequency of the Vsync thread is adjusted to the second frequency, thus achieving the adjustment of the application refresh rate.

In addition, when the number of rendering times of the rendering thread in unit time is less than the system refresh rate, a proportional relationship between the number of rendering times of the rendering thread in unit time and the system refresh rate can be further determined. When the number of rendering times of the rendering thread in unit time is 0, the second frequency can be directly set in a preset range. When the number of rendering times of the rendering thread in unit time is not 0 and less than 1/n of the system refresh rate, the second frequency can be set to 1/n of the system refresh rate, where n is a positive integer, and 1/n may be a minimal value of the system refresh rate that is larger than the number of the rendering times of the rendering thread in unit time. For example, when the number of rendering times of the rendering thread in unit time is 32 times and the system refresh rate is 120 times, the second frequency can be set to ½ or ⅓ of the system refresh rate, preferably ⅓, that is, n is 3.

It can be seen that in this embodiment, after receiving the Vsync signal request message, the synthesis system adjusts the Vsync signal transmission frequency of the Vsync thread based on the number of rendering times of the rendering thread in unit time. It can be seen that other parameters can also be determined, and the Vsync signal transmission frequency of the Vsync thread can also be adjusted.

Figure 4:
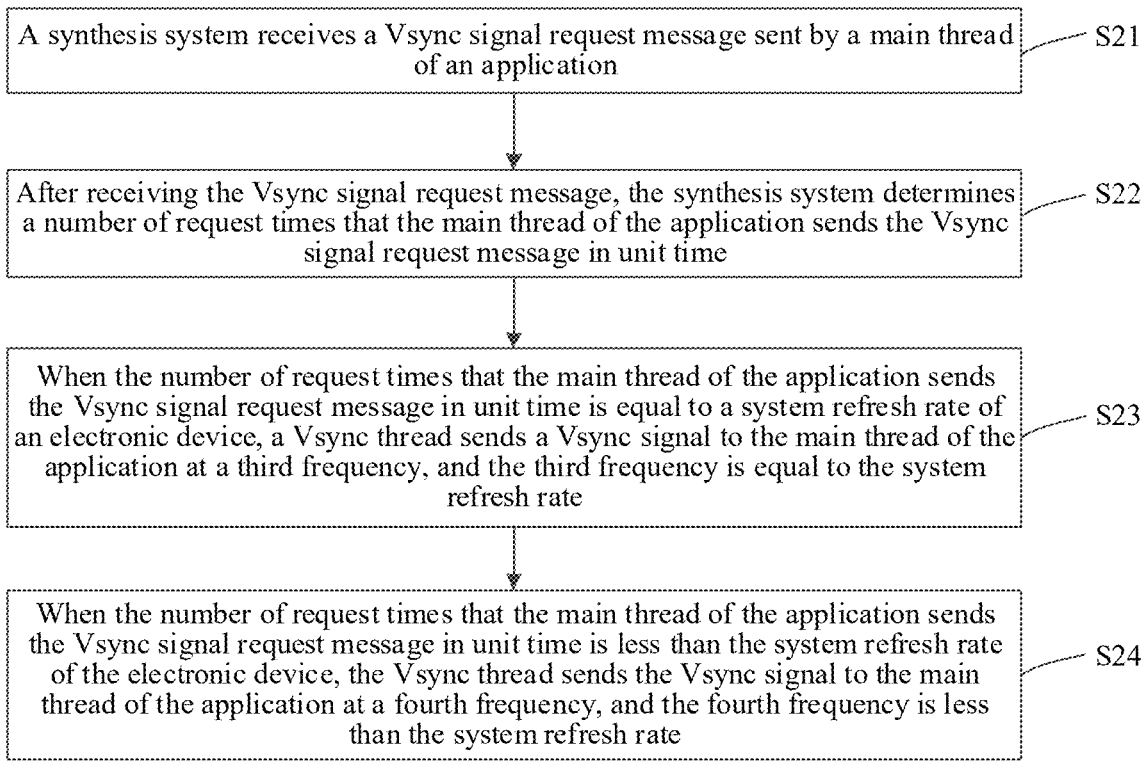
FIG. 4 is a flowchart of a method for controlling a Vsync signal according to an embodiment of the present disclosure.

Exemplarily, FIG. 4 shows a flowchart of a method for controlling a Vsync signal according to an embodiment of the present disclosure.

As shown in FIG. 4, the method for controlling a Vsync signal according to the embodiment of the present disclosure includes the following steps:

S21: A synthesis system receives a Vsync signal request message sent by a main thread of an application.

S22: After receiving the Vsync signal request message, the synthesis system determines a number of request times that the main thread of the application sends the Vsync signal request message in unit time;

S23: When the number of request times that the main thread of the application sends the Vsync signal request message in unit time is equal to a system refresh rate of the electronic device, a Vsync thread sends a Vsync signal to the main thread of the application at a third frequency, where the third frequency is equal to the system refresh rate.

S24: When the number of request times that the main thread of the application sends the Vsync signal request message in unit time is less than the system refresh rate of the electronic device, the Vsync thread sends the Vsync signal to the main thread of the application at a fourth frequency, where the fourth frequency is less than the system refresh rate.

Specifically, in this embodiment, after receiving the Vsync signal request message, the synthesis system adjusts the Vsync signal transmission frequency of the Vsync thread based on the number of request times that the main thread of the application sends the Vsync signal request message in unit time (the number of request times for short). When the number of request times is equal to the system refresh rate of the electronic device, the Vsync thread sends the Vsync signal to the main thread of the application at the system refresh rate, and the main thread of the application measures, lays out and draws the image frame according to the Vsync signal. When the number of request times is less than the system refresh rate of the electronic device, the Vsync signal transmission frequency needs to be adjusted, that is, the Vsync thread sends the Vsync signal to the main thread of the application at the fourth frequency that is less than the system refresh rate, to reduce the Vsync signal transmission frequency, the frequency of waking up the main thread of the application through the Vsync signal may also be reduced. Finally, the purpose of reducing power consumption is realized.

In some embodiments, when the number of request times that the main thread of the application sends the Vsync signal request message in unit time is less than 1/m of the system refresh rate, the fourth frequency may set to 1/m of the system refresh rate, where m is a positive integer, 1/m may be a minimal value of the system refresh rate that is greater than the number of request times, and a valuing mode of m may refer to the valuing of n in the foregoing embodiment of determining the number of rendering times.

When adjusting the Vsync signal transmission frequency of the Vsync thread, the Vsync thread may not send the Vsync signal in at least part of moments, so that the Vsync thread switches to the fourth frequency from the third frequency to send the Vsync signal to the main thread of the application, and the at least part of moments is a moment that is determined based on the system refresh rate and in which the Vsync signal needs to be sent.

It should be noted that an adjusting mode for the Vsync signal transmission frequency of the Vsync thread, and measuring, laying out and drawing processes of the main thread of the application may refer to the description in the foregoing embodiment of adjusting the Vsync signal transmission frequency based on the number of rendering times of the rendering thread in unit time, and details are not described herein again.

Figure 5:
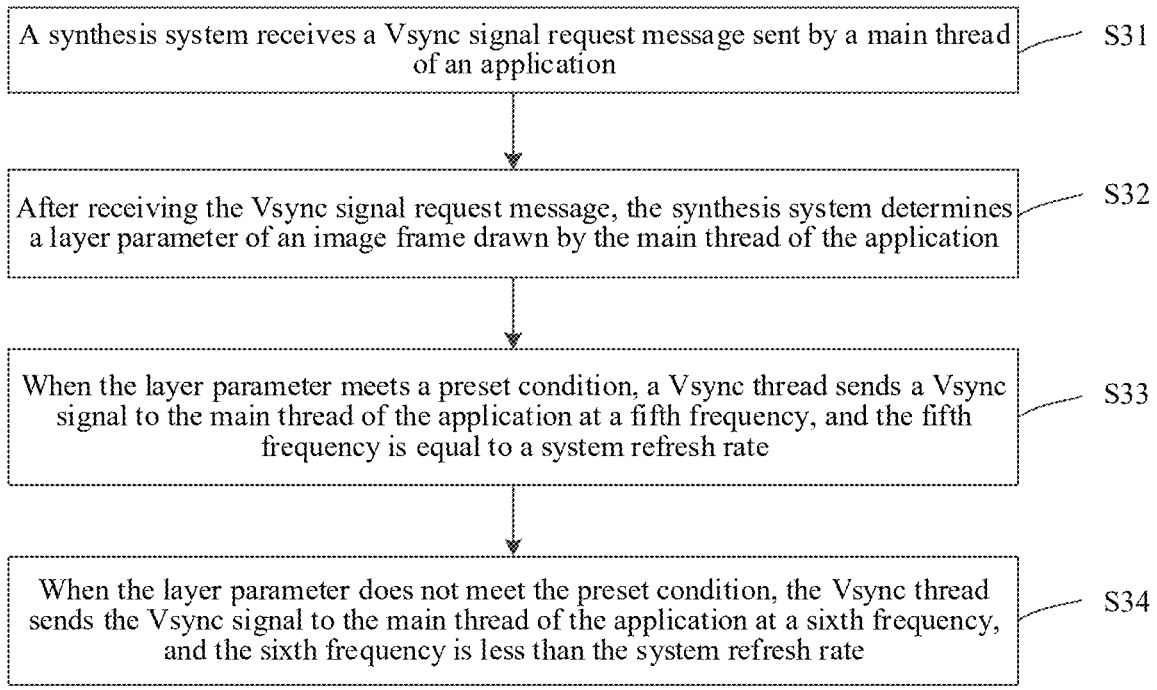
FIG. 5 is a flowchart of a method for controlling a Vsync signal according to an embodiment of the present disclosure.

Exemplarily, FIG. 5 shows a flowchart of a method for controlling a Vsync signal according to an embodiment of the present disclosure.

As shown in FIG. 5, the method for controlling a Vsync signal according to the embodiment of the present disclosure includes the following steps:

S31: A synthesis system receives a Vsync signal request message sent by a main thread of an application.

S32: After receiving the Vsync signal request message, the synthesis system determines a layer parameter of an image frame drawn by the main thread of the application;

S33: When the layer parameter meets a preset condition, a Vsync thread sends a Vsync signal to the main thread of the application at a fifth frequency, where the fifth frequency is equal to a system refresh rate.

S34: When the layer parameter does not meet the preset condition, the Vsync thread sends the Vsync signal to the main thread of the application at a sixth frequency, where the sixth frequency is less than the system refresh rate.

In this embodiment, after receiving the Vsync signal request message, the synthesis system adjusts the Vsync signal transmission frequency of the Vsync thread based on the layer parameter of the image frame drawn by the main thread of the application. When the layer parameter meets the preset condition, the Vsync thread sends the Vsync signal to the main thread of the application at a system refresh rate, to wake up the main thread of the application to measure, lay out and draw the image frame. When the layer parameter does not meet the preset condition, the Vsync thread sends the Vsync signal to the main thread of the application at the sixth frequency that is less than the system refresh rate, and the refresh rate of the main thread of the application may also be reduced at this time, so as to achieve the purpose of reducing unnecessary power consumption of the application thread.

As a specific example, the Vsync thread does not send the Vsync signal in at least part of moments, so that the Vsync thread sends the Vsync signal to the main thread of the application at the sixth frequency, and the at least part of moments is a moment that is determined based on the system refresh rate and in which the Vsync signal needs to be sent.

Specifically, the layer parameter of the image frame may include at least one of a layer area, a layer transparency, a scaling factor and an application layer identifier. When the layer parameter of the image frame is the layer area, the layer parameter does not meet the preset condition when the layer area of the image frame is less than a first preset value; and the layer parameter meets the preset condition when the layer area of the image frame is greater than or equal to the first preset value. When the layer parameter of the image frame is the layer transparency, the layer parameter does not meet the preset condition when the layer transparency of the image frame is greater than a second preset value; and the layer parameter meets the preset condition when the layer transparency of the image frame is less than or equal to the second preset value. When the layer parameter of the image frame is the scaling factor, the layer parameter does not meet the preset condition when the scaling factor of the image frame is greater than a third preset value; and the layer parameter meets the preset condition when the scaling factor of the image frame is less than or equal to the third preset value. When the layer parameter of the image frame is the application layer identifier, the layer parameter meets the preset condition when the application layer identifier of the image frame belongs to a range of a preset list of perceivable application layers; and the layer parameter does not meet the preset condition when the application layer identifier of the image frame does not belong to the range of the preset list of perceivable application layers.

It should be noted that according to the method for controlling a Vsync signal provided by the present disclosure, the number of rendering times of the rendering thread in unit time, the number of request times that the main thread of the application sends the Vsync signal request message in unit time, and whether the layer parameter meets the preset condition can be understood as three different request parameters related to the main thread of the application. When determining the Vsync signal transmission frequency, the number of rendering times of the rendering thread in unit time, the number of request times that the main thread of the application sends the Vsync signal request message in unit time, and whether the layer parameter meets the frequency adjustment condition can be determined alternatively, that is, the determining of the number of rendering times, the number of request times and the layer parameter are of an "or" relationship. In addition, the number of rendering times, the number of request times and the layer parameter may also be determined at the same time, and the three ones are of an "and" relationship at this time. When the foregoing conditions are of the "and" relationship, a determining order and combination of the conditions can be flexibly set according to specific application scenarios, for example, the number of rendering times, the number of request times and the layer parameter can be determined in sequence. Alternatively, the number of rendering times and the number of request times can be determined in sequence. Alternatively, the number of rendering times and the layer parameter can be determined in sequence. Alternatively, the layer parameter and the number of request times can be determined in sequence, etc.

Exemplarily, the synthesis system adjusts the Vsync signal transmission frequency of the Vsync thread by setting a timer. When setting time of the previous timer expires, the synthesis system can determine whether each foregoing request parameter meets the corresponding Vsync signal transmission frequency adjustment condition. When the frequency adjustment condition is met (including the number of rendering times is less than the system refresh rate, the number of request times is less than the system refresh rate, and the layer parameter does not meet the frequency adjustment condition), the Vsync signal transmission frequency of the Vsync thread can be reduced. When each request parameter does not meet the frequency adjustment condition, the Vsync thread sends the Vsync signal to the main thread of the application at an inherent frequency, such as the system refresh rate.

In some embodiments, after receiving the Vsync signal sent by the Vsync thread, the main thread of the application invokes a callback function through the Vsync signal to wake up the main thread of the application. The main thread of the application measures and lays out the image frame. When results of the measurement and layout meet a preset drawing condition, the main thread of the application triggers the rendering thread. The rendering thread renders the image frame to form rendering buffer data and sends the data to the synthesis system. The synthesis thread in the synthesis system synthesizes the image frame according to the rendering buffer data, and sends the data to the screen for display.

As a specific example, the main thread of the application drawing the image frame according to the Vsync signal, and displaying through the terminal may further include the following steps:

Step 1: A synthesis system wakes up the Vsync thread in the synthesis system based on the callback function.

Step 2: An awakened Vsync thread generates the Vsync signal, and sends the Vsync signal to the main thread of the application at the adjusted transmission frequency, to wake up the main thread of the application through the Vsync signal.

Step 3: The rendering thread in an application process is woken up based on the main thread of the application, rendering and drawing of the image frame is performed through the rendering thread to form rendering buffer data, and send the rendering buffer data to the synthesis system.

Step 4: The synthesis system synthesizes the image frame according to the rendering buffer data to form a display image, and sends the display image to the terminal for final display.

In some embodiments, when the rendering and drawing of the image frame is performed through the rendering thread, the rendering thread may form the rendering buffer data after rendering, and send the rendering buffer data to the synthesis system. The rendering buffer data may be temporarily stored in a buffer region to form a queue buffer. The synthesis system can perform layer synthesis in sequence according to the rendering buffer data in the buffer queue, and send a synthesized layer to the terminal for display. When layer synthesis is performed based on the rendering buffer data, the synthesis system can obtain the number of rendering times of the currently applied rendering thread in unit time by counting a layer process identification PID (Process Identification, PID) of the rendering buffer data and a current time stamp, and then can determine a corresponding rendering rate. Then, the synthesis thread performs layer synthesis based on the rendering rate.

As a specific example, in the following, taking the determining between the three different request parameters, namely, the number of rendering times, the number of request times and the layer parameter, and the corresponding frequency adjustment condition as examples, the method for controlling a Vsync signal provided by the present disclosure will be described in detail respectively.

First Embodiment

Transmission of a Vsync signal is controlled based on a relationship between a number of rendering times of a rendering thread in unit time and a system refresh rate.

A basis or request parameter of frequency adjustment is the number of rendering times of the rendering thread in unit time. In the first embodiment, when the number of rendering times of the rendering thread in unit time is less than the system refresh rate, it means that the request parameter meets a frequency adjustment condition, and a Vsync signal transmission frequency may be reduced in this case.

A method for controlling a Vsync signal shown in the first embodiment includes the following:

Firstly, a synthesis thread obtains, based on first historical map object data, the number of rendering times of the rendering thread of the application in unit time such as 1 s. Then, when the number of rendering times is less than the system refresh rate, and it is determined that the number of rendering times meets the frequency adjustment condition, a Vsync thread does not send the Vsync signal in at least part of moments, that is, skipping sending several Vsync signals. The Vsync signal transmission frequency of the Vsync thread is adjusted to a second frequency that is less than the system refresh rate, a refresh rate of the main thread of the application may also be reduced. This process may be further classified as follows according to the specific number of rendering times:

1. If a synthesis system determines that the number of rendering times of the rendering thread in unit time is 0, a refresh rate of a current application in the main thread of the application is controlled to fall within a preset range. The preset range may be set according to scenarios, but is usually less than the system refresh rate.

2. If the synthesis system determines that the number of rendering times of the rendering thread in unit time is not 0 and less than 1/n of the system refresh rate, the Vsync thread skips sending at least one Vsync signal. By adjusting a number of skipped Vsync signals, that is, the Vsync thread skips n−1 Vsync signals, the Vsync signal frequency is adjusted to 1/n of the system refresh rate, that is, the second frequency, and an application refresh rate is also reduced to 1/n of the original. It can be seen that the more Vsync signals are skipped, the lower the application refresh rate is. n is one of preset k positive integers, so that when n is the positive integer, a difference between a value of the system refresh rate divided by the positive integer and the number of rendering times is minimum and greater than 0, that is, $n=\max\{n_i|(\text{system refresh rate}/n_i)-\text{number of rendering times}>0, \text{ and } n_i \in N, i=1\sim k, k \neq 0 \text{ and } k \in N\}$. For example, when the number of rendering times of the rendering thread in 1 s is 39, and the system refresh rate is 120, a plurality of preset positive integers $(n_1 \sim n_k)$ are 2, 3 and 6. It can be seen that the number of rendering times may be less than ½ of the system refresh rate, and meanwhile is also less than ⅓ of the system refresh rate, and 1/n may be a minimum value between them, that is, n is 3. In this case, the Vsync thread may skip two Vsync signals. When a third Vsync signal arrives, the main thread of the application is awakened to measure, lay out, and draw an image frame.

For example, when a user is browsing a page or playing a game in a foreground, and an application such as music playing is used in a background, the music playing application may not render an image frame (in this case, a number of rendering times of a rendering thread of the application is zero), and the user only perceives sound of music playing, but does not perceive an interface change of the music playing application. Therefore, refresh rates of such applications may be reduced, and the user has no experience difference. In addition, when the user plays a low-frame-rate game, such as a match-3 game, when the system refresh rate is 120 Hz, the main thread of the application still renders the image frame at the frequency of 60 Hz. In this case, the Vsync signal transmission frequency of the Vsync thread may be reduced to 60 Hz, to adjust to the refresh rate of the application, so that half power consumption of a UI thread of the application may be reduced.

The first historical map object data includes the number of rendering times of the rendering thread of the application in 1 second. The data can be obtained according to relevant data of the rendering thread in a historical rendering process. The first historical map object data includes a key value and a value corresponding to the key value, where the key value is used to record a PID of the application and the value is used to record the number of rendering times corresponding to the PID. When the number of rendering times is less than the system refresh rate, it is determined that the Vsync signal transmission frequency of the Vsync thread needs to be adjusted.

Second Embodiment

Transmission of a Vsync signal is controlled based on a relationship between a number of request times that a main thread of an application sends a Vsync signal request message in unit time and a system refresh rate.

In the second embodiment, when the number of request times that the main thread of the application sends the Vsync signal request message in unit time is less than the system refresh rate, it means that a request parameter meets a frequency adjustment condition, and a Vsync signal transmission frequency can be reduced in this case.

A method for controlling a Vsync signal shown in this embodiment includes the following:

A synthesis system obtains, based on second historical map object data, the number of request times that the main thread of the application sends the Vsync signal request message in unit time, such as 1 s.

The synthesis system determines whether the number of request times is less than the system refresh rate.

When the synthesis system determines that the number of request times is less than the system refresh rate, the Vsync thread sends the Vsync signal to the main thread of the application at a fourth frequency, and the fourth frequency is less than the system refresh rate.

For example, when the synthesis system determines that the number of request times that the main thread of the application sends the Vsync signal request message in unit time is less than 1/m of the current system refresh rate, the Vsync thread can skip sending m−1 Vsync signals, and the Vsync signal transmission frequency is reduced to 1/m of the original. m is one of preset p positive integers, so that when m is the positive integer, a difference between a value of the system refresh rate divided by the positive integer and the number of request times is minimum and greater than zero, where p is the positive integer, that is, $m=\max\{m_i|$ (system refresh rate/$m_i$)−number of request time>0, and $m_i \in N$, i=1~p, p≠0, and p∈N}. A valuing mode of m is the same as a valuing mode of n in the foregoing process of determining the number of rendering times. Specific examples may be mutually referred to.

The second historical map object data includes the number of request times that the main thread of the application sends the Vsync signal request message in unit time, such as 1 second. The data may be obtained according to data related to the number of request times that the main thread of the application sends the Vsync signal request message. The second historical map data further includes a key value and a value, where the key value is used to record a PID of the application, and the value is used to record the number of request times that the main thread of the application corresponding to the PID sends the Vsync signal request message.

It should be noted that the number of rendering times of the rendering thread in unit time, the number of request times that the main thread of the application sends the Vsync signal request message in unit time may be separately determined, and may also be combined with each other for comprehensive determining. When the number of rendering times and the number of request times are determined at the same time, whether the number of request times meets the frequency adjustment condition may be further determined when the number of rendering times meets a situation of not adjusting the Vsync signal transmission frequency. When one of the number of rendering times and the number of request times meets the frequency adjustment condition, the Vsync signal transmission frequency of the Vsync thread can be directly reduced.

As a specific embodiment, when the number of rendering times and the number of request times are combined for determining, the method for controlling a Vsync signal may include the following: When the main thread of the application sends rendering buffer data to the synthesis system, the synthesis system counts the number of rendering times that the rendering thread of the application renders the image frame in preset time, and meanwhile records the number of request times that the main thread of the application sends the Vsync signal request message. When the number of request times of the main thread of the application is approximately equal to the current system refresh rate, the synthesis system further determines a situation of a rendering buffer. If the application does not send the rendering buffer data to the synthesis system, the refresh rate of the main thread of the application is directly reduced to below a critical value or within a preset range. If the number of times that the application sends the rendering buffer data to the synthesis system is not 0 and less than ½, ⅓, ¼, or the like of the current system refresh rate, the synthesis system determines that a rendering speed of the current application cannot meet a current frame rate requirement, the Vsync signal transmission frequency of the Vsync thread may be reduced by the synthesis system, and the refresh frequency of the application is reduced to ½, ⅓, ¼, or the like of the original.

In the second embodiment, if the number of times that the main thread of the application sends the Vsync signal request message is relatively low, the synthesis system may reduce the refresh rate of the application directly by adjusting the Vsync transmission frequency. For example, when a user plays a star-ball game in Alipay, at the refresh rate of 120 Hz, the Vsync signal request frequency of the application may be less than ½ of the system refresh rate due to freezing. To improve performance experience for the user, the refresh rate of the application may be fixed to be less than ½ of the system refresh rate.

In the second embodiment, the second historical map object data includes the layer PID and a request frame rate (the request frame rate may be determined based on the number of request times) at which the main thread of the application sends the Vsync signal request message in unit time. In the process of determining the number of request times, firstly, the synthesis system may determine a time stamp at which the historical application that has the same layer PID consumes the Vsync signal last time, based on the layer PID of the main thread of the application that sent the Vsync signal request message. Then, a difference between current time and a time point corresponding the last consumption time stamp is obtained. Whether the difference meets a preset frame rate threshold is determined. If no, the Vsync signal transmission frequency is adjusted by the Vsync thread, and the Vsync signal request message transmission frequency of the main thread of the application is adjusted. The preset frame rate threshold may be set according to specific application scenarios.

It can be seen that this embodiment can adjust the Vsync signal transmission frequency of the Vsync thread according to the number of request times that the main thread of the application sends the Vsync signal request message, so as to reduce the Vsync signal transmission frequency for an unnecessary request of the main thread of the application and the application of which a request speed cannot meet the current frame rate, implementing the adjustment of the application refresh rate and preventing resource waste.

Third Embodiment

Transmission of the Vsync signal is controlled based on a relationship between the layer parameter of the image frame drawn by the main thread of the application and the preset condition.

In the third embodiment, the layer parameter includes a layer area, a layer transparency, a scaling factor and an application layer identifier of an image frame requested to be drawn. When the layer parameter does not meet the preset condition, it means that the request parameter meets the frequency adjustment condition, and the Vsync signal transmission frequency can be reduced at this time. The Vsync thread sends the Vsync signal at a sixth frequency that is less than the system refresh rate.

In the third embodiment, the method for controlling a Vsync signal includes the following:

The synthesis system obtains, based on the third historical map object data, the layer area in the layer parameter of the current image frame requested to be drawn. A relationship between the current layer area and a first preset value is determined through the synthesis system. If the layer area is less than the first preset value, the first preset value can be set according to the specific size of a display screen of an electronic device. It can be considered that the area of the image frame requested to be drawn is relatively small, which has little influence on perception experience of the user, and rendering and drawing cannot be performed on such type of image frames. Therefore, it can be considered that the layer parameter of the current image frame meets the frequency adjustment condition, and the Vsync thread does not send the Vsync signal in at least part of moments, so that the Vsync thread sends the Vsync signal to the main thread of the application at the sixth frequency.

In the third embodiment, the method for controlling a Vsync signal may further include the following:

The synthesis system obtains, based on third historical map object data, the layer transparency in the layer parameter of the current image frame requested to be drawn. A relationship between the current layer transparency and a second preset value is determined through the synthesis system. If the layer transparency of the current image frame is greater than the second preset value, it can be considered that the transparency of the image frame requested to be drawn is relatively high, it may be a fuzzy display covering other layers displayed on the display screen, or a display that has little influence on user experience, etc. In such cases, it can be considered that the layer parameter of the current image frame meets the frequency adjustment condition, and the Vsync thread does not send the Vsync signal in at least part of moments, so that the Vsync thread sends the Vsync signal to the main thread of the application at the sixth frequency.

As an example, the layer transparency is expressed as a percentage. Usually, the stage from a layer to colorless and transparent display can be divided into 100 parts, and then the influence of the current image frame on another layer after overlapping can be expressed as a percentage. For example, an Alpha Channel (Alpha Channel) or an Alpha value of a layer refers to the transparency or translucency of a picture, affecting the overlapping effect with another picture (or background).

In the third embodiment, the method for controlling a Vsync signal may further include the following:

The synthesis system obtains, based on third historical map object data, the scaling factor in the layer parameter of the current image frame requested to be drawn. A relationship between the current scaling factor and a third preset value is determined through the synthesis system. If the scaling factor of the current image frame is greater than the third preset value, it can be considered that the scaling factor of the image frame requested to be drawn is relatively large, resulting in lower resolution. In such cases, it can be considered that the layer parameter of the current image frame meets the frequency adjustment condition, and the Vsync thread does not send the Vsync signal in at least part of moments, so that the Vsync thread sends the Vsync signal to the main thread of the application at the sixth frequency.

During a display process of the image frame, there may be size scaling of the image frame, and an absolute pixel (that is, a final actual value of a pixel) of the layer is usually controlled by two parameters, one is resolution (resolution) and the other is the scaling factor (scale). The greater the image scaling factor, the lower the resolution. Therefore, when determining whether the layer parameter meets a third preset condition, a scaling factor threshold can be referred to, and then some layers with satisfactory resolutions are displayed, while others are ignored.

In the third embodiment, the method for controlling a Vsync signal may further include the following:

The synthesis system obtains, based on third historical map object data, the application layer identifier in the layer parameter of the current image frame requested to be drawn. The synthesis system obtains a preset list of perceivable application layers, and determines whether the application layer identifier belongs to the preset list of perceivable application layers. The application layer identifier may be a unique identification of the layer or an identification symbol, such as a layer process ID, that can be used to distinguish different layer. When the application layer identifier does not belong to the preset list of perceivable application layers, the synthesis system determines that the layer parameter of the current image frame meets the frequency adjustment condition, and the Vsync thread does not send the Vsync signal in at least part of moments, or for the case that the layer parameter of the current image frame does not belong to the list of perceivable application layers, a corresponding frame rate range is set directly, and adjustment is performed according to the frame rate range.

In the third embodiment, the synthesis system can find the layer PID of the corresponding layer through the application layer identifier, and determine whether the current application is a focus application based on the layer PID. If no, it can be considered that the current application is a background process, and find the application UID. At this time, if an allowable frame rate range of the background process is configured, when the main thread of the application sends the Vsync signal request message, the synthesis system can control a message interval at which the main thread of the application sends the request messages, and control a Vsync signal request rhythm within a preset range, for example, the preset range can be set to 20 Hz to 40 Hz. In addition, when there is no preset frame rate range, the application refresh rate can be adjusted according to a relationship between the system refresh rate and the application refresh rate.

It should be noted that in the process of determining the layer area, layer transparency, scaling factor and application layer identifier of the current image frame, the foregoing cases are of an "or" relationship. That is, when determining whether the parameter of the current image frame meets the preset condition, the layer area, layer transparency, scaling factor, application layer identifier and the like of the current image frame can be obtained at the same time. If one of the foregoing parameters cannot meet, it can be considered that the current image frame has poor user perceptibility, and the Vsync thread does not send the Vsync signal in at least part of moments at this time, to adjust the application refresh rate.

In the third embodiment, the list of perceptible applications is a list of a layer range corresponding to functions that has relatively high user perceptibility, the user is concerned about or frequently use. In the specific application, the range of the list of perceptible applications can be set according to usage scenarios. In addition, when the user listens to music, watches a video, plays a game, browses a web page and performs another operation, corresponding the preset condition can be flexibly set according to different application scenarios, and the layer area, layer transparency, scaling factor, application layer identifier, and the like can be selectively set.

The foregoing third historical map object data includes area, transparency, a scaling factor, an application layer identifier and other data of the current image frame corresponding to the layer parameter. The third historical map object data includes a key value and a value corresponding to the key value, where the key value is used to record the PID of the application, the value is used to record an area value, a transparency value, a scaling factor value, an application layer identifier and the like corresponding to the PID.

In the third embodiment, when determining the layer transparency and the scaling factor of the current image frame, to simplify a treatment process, the synthesis system may further perform a partitioning treatment on the current image frame. That is, the current image frame is divided into at least two regions. For example, the current image frame is divided into upper, middle, and lower or left, middle and right regions. Then, the transparency and the scaling factor of each region are sampled, and then Hash operation is performed on sampling data of each region. The layer transparency and the scaling factor are finally determined based on results of the Hash operation.

On the other hand, when the layer parameter does not meet the preset condition, the synthesis system may further record the layer PID of the current image frame and the application UID, and find a configured frame rate range of imperceptible applications according to a configuration file. The frame rate at which the application UID requests the Vsync signal is controlled based on the frame rate range of the imperceptible applications.

It can be seen that in the third embodiment, whether to adjust the Vsync signal transmission frequency through the Vsync thread is determined through the layer parameter of the current image frame. Foreground applications with low user perception and background threads can be ignored, so as to prevent invalid high-frequency refresh of a background under the working condition of high refresh rate in a foreground, thus avoiding SOC resource waste and improving the performance of the device.

Since the number of rendering times of the rendering thread in unit time can be determined based on the first historical map object data, a number of request times that the main thread of the application sends the Vsync signal request message in unit time can be determined based on the second historical map object data, and the layer parameter of the image frame can be determined based on the third historical map object data, when the Vsync signal transmission frequency is controlled through the foregoing three request parameters, at least one request parameter can be selected, and at least two request parameters can be selected for combined control. For example, when the Vsync signal transmission frequency is controlled by combining the three request parameters, the first historical map object data, the second historical map object data and the third historical map object data need to be obtained. Then, the corresponding request parameters are determined based on values recorded in the three types of object data. The three types of object data can be obtained in different stages of an image frame drawing process.

Figures 1, 6:
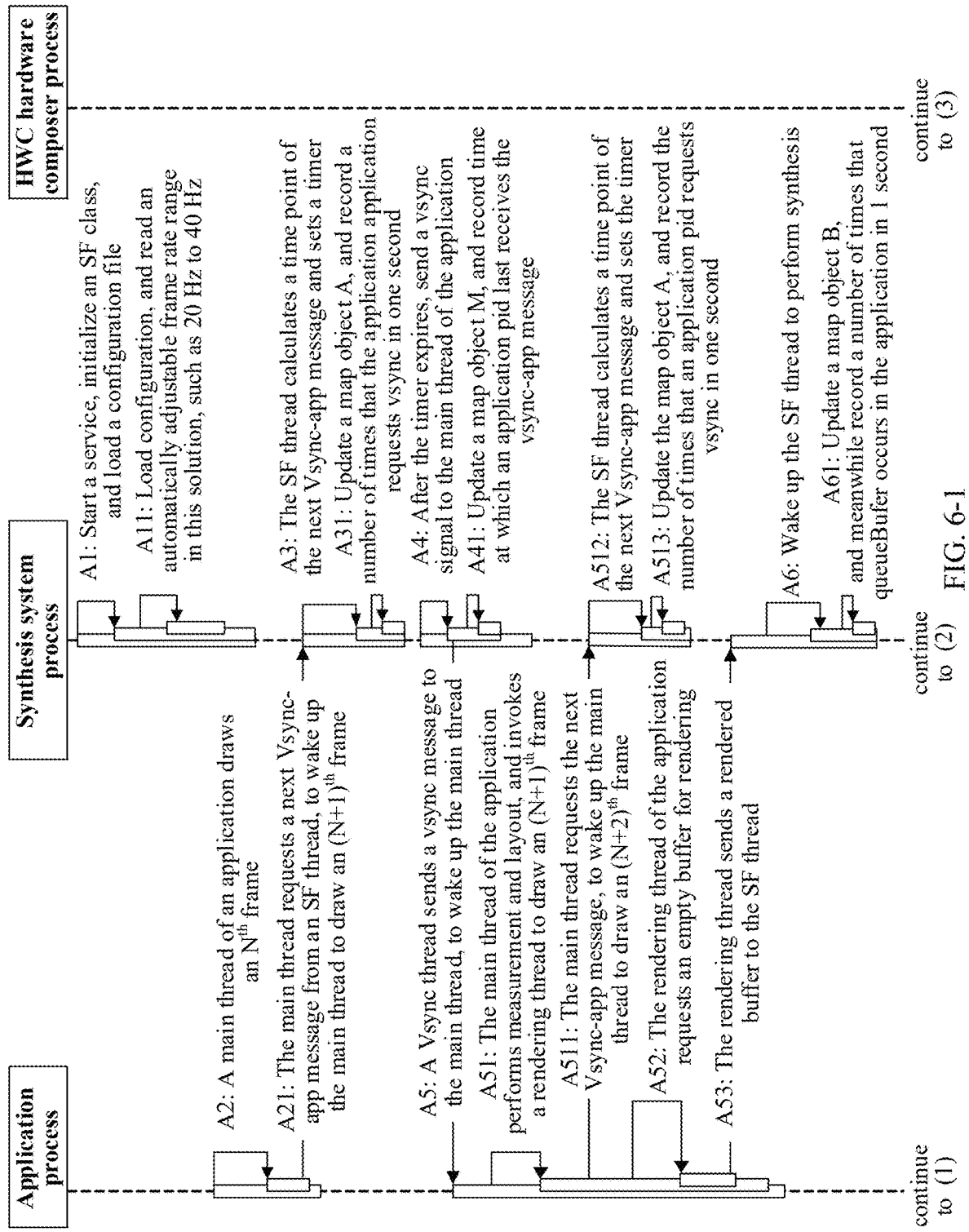
Figures 2, 6:
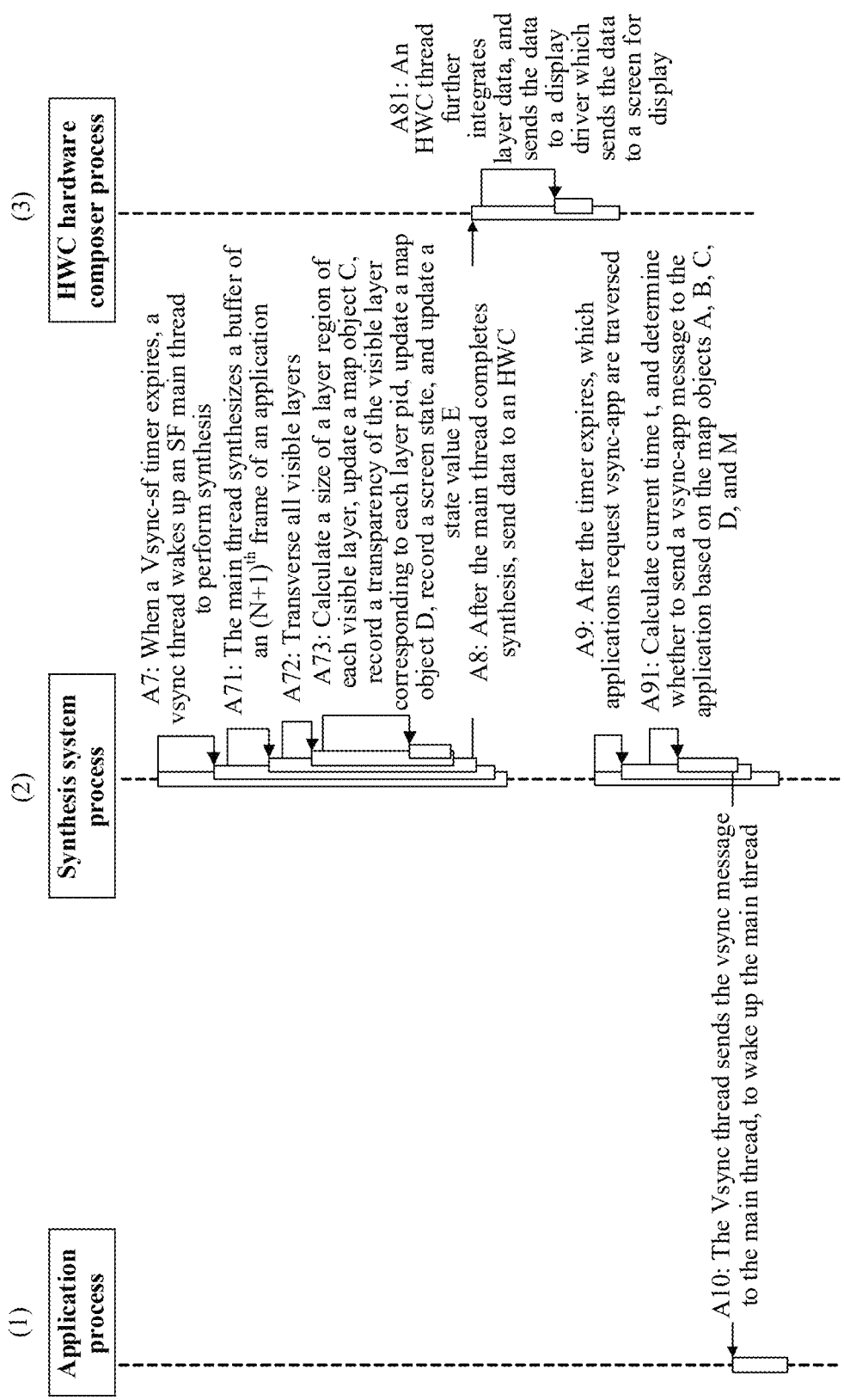

Specifically, FIG. 6-1 and FIG. 6-2 jointly shows a schematic flow of an acquiring process for the first historical map object data, the second historical map object data and the third historical map object data in the method for controlling a Vsync signal according to an embodiment of the present disclosure.

As jointly shown in FIG. 6-1 and FIG. 6-2, the process involved in the flow may include application process (including a main thread and a rendering thread of an application), synthesis system process (including an SF thread and a Vsync thread) and an HWC hardware composer process. The processes involved here are main modules to implement the flow, and in actual implementations, there may be other module processes, which can be determined according to actual use requirements, and is not limited in the embodiments of the present disclosure. As jointly shown in FIG. 6-1 and FIG. 6-2, the flow may include step A1 to step A10.

The HWC has a function or ability to use hardware to complete image data combination and display, and specific image display can be coordinately completed by a plurality of classes, such as SurfaceFlinger (SF), HWC, and a display screen. The HWC is a hardware abstraction layer for window/layer synthesis and display in the Android system. Implementation of the HWC is device-specific, and is usually completed by a display device manufacturer (OEM), providing hardware support for the SurfaceFlinger service.

It should be noted that the Vsync signals may be divided into software Vsync signals and hardware Vsync signals. The software Vsync signals include Vsync-APP and Vsync-SF. The Vsync-APP is used to trigger a drawing and rendering thread in the application process. The Vsync-SF is used to trigger a synthesis thread in the synthesis system. The hardware Vsync signal (Vsync-HW) is used to trigger a screen display refresh flow. Since the Vsync signals include the Vsync-APP and the Vsync-SF. When adjusting the Vsync signal transmission frequency, a Vsync-APP transmission frequency or a Vsync-SF transmission frequency can be separately adjusted, and the Vsync-APP transmission frequency and the Vsync-SF transmission frequency can also be adjusted at the same time, each of which may play a role in reducing power consumption and waste. The adjustment of the Vsync-APP transmission frequency will be described in detail below as an example.

Step A1: After a service starts, an SF class is initialized, and a configuration file is loaded.

Step A11: The synthesis system loads the configuration file, and reads an automatically adjustable frame rate range, that is a preset range, such as 20 Hz to 40 Hz, in the embodiment of the present disclosure.

Step A2: The main thread of the application draws an $N^{th}$ image frame online.

Step A21: The main thread of the application invokes a requestNextVsync( ) function to request a next Vsync-app message from the SF thread, to wake up the main thread of the application to draw the (n+1)$^{th}$ frame.

A3: The SF thread calculates a time point of the next Vsync-app message, records the layer PID and socket fd of the currently requested Vsync-app message, and sets the timer. The timer is configured to wake up the main thread of the application to draw the (N+1)$^{th}$ frame after the timer expires. When the timer does not expire, the Vsync thread does not send the Vsync signal to the main thread of the application.

A31: The synthesis system updates a map object A (that is, the second historical map object data, the same below), and records the number of times that the application corresponding to the layer PID sends the Vsync signal request message in 1 second.

A4: When the timer expires, the synthesis system traverses to determine which applications request the Vsync-app, and sends the Vsync signals to the socket fds which request the Vsync signals.

A41: The synthesis system updates a map object M (the data is used to determine the application refresh rate), records the time at which the layer PID receives the Vsync-app message for the last time. Since the map object M records the time at which the application corresponding to the layer PID receives the Vsync-app message for the last time, the application refresh rate can be determined according to the time point and current time, so as to adjust the application refresh rate. For example, in a screen-off state, the application refresh rate can be directly adjusted to a preset range.

A5: The Vsync thread sends the Vsync signal to the main thread of the application, and accordingly wake up the main thread of the application.

A51: The main thread of the application performs measurement and layout according to the Vsync signal, and invokes the rendering thread to draw an (N+1)$^{th}$ frame.

A511: The main thread of the application invokes the requestNextVsync( ) function to request the next Vsync-app message from the SF thread, to wake up the main thread to draw an (N+2)$^{th}$ frame.

A512: The SF thread calculates a time point of the next Vsync-app message, records the PID and socket fd of the currently requested Vsync-app message, and sets the timer. When the timer expires, the main thread of the application is awakened to draw the (N+2)$^{th}$ frame.

A513: The synthesis system updates the map object A, and records the number of times that the layer PID sends the Vsync signal request message in 1 second.

A52: The rendering thread invokes a dequeuebuffer( ) function to disclose an empty Buffer from a queue buffer (queueBuffer) for rendering. The queue buffer is configured to store a buffer, generate a Vsync signal request, wake up the SF thread, and the like.

A53: The rendering thread sends the rendered Buffer to the SF thread through a queuebuffer function.

A6: The synthesis system invokes a setTransactionState( ) function in the SF thread across threads, and sets a Vsync-sf timer in the function, to wake up the SF main thread for synthesis.

A61: The synthesis system updates the map object B (that is, the first historical map object data, the same below), and records the number of times that the layer PID queueBufer occurs in 1 second, also referred to as the number of rendering times.

A7: When the Vsync-sf timer expires, the Vsync thread wakes up the SF thread for synthesis.

A71: The SF thread synthesizes a Buffer for applying the (N+1)$^{th}$ frame.

A72: The synthesis system traverses all visible layers in an Output: collectVisibleLayers function.

A73: The synthesis system calculates the size of a layer region of each visible layer, finds the layer PID to which the layer belongs, records the layer area of the visible layer corresponding to each layer PID, updates a map object C (that is, the area in the third historical map object data), records the transparency of the visible layer corresponding to each layer PID (that is, the transparency in the third historical map object data), records a screen state and updates a state value E, and records that whether the screen is turned on.

A8: After completing the synthesis of the image frame, the synthesis system calls an HwcPresentDisplay( ) function, and sends data to the HWC hardware composer process.

A81: The HWC hardware composer process further integrates layer data, and sends the data to the display driver. After the TE signal arrives, the display driver sends the TE signal to the screen for display.

After the execution of the foregoing steps, the first historical map object data, the second historical map object data and the third historical map object data can be obtained. Then, when the main thread of the application further sends the Vsync signal request message, determining can be performed accordingly, and the application refresh rate can be adjusted.

A9: When the next timer expires, the synthesis system traverses which applications request the Vsync-app.

A91: The synthesis system determines the current application refresh rate based on the object M and current time t, and then decides whether to send the Vsync-app message to the application based on the map objects A, B, C, and D.

A10: When the decision result of step A91 is to send the Vsync-app message, the Vsync thread sends the Vsync signal to the main thread of the application, to wake up the main thread.

It can be seen that if the decision result of step A91 is to not send, the timer is set to continuously wait for next determining.

After the first historical map object data, the second historical map object data, and the third historical map object data are obtained through the foregoing flow, whether to send the Vsync-APP message to the main thread of the application can be decided in A91 according to the current time t and the map objects A, B, C, D, and M.

Figure 7:
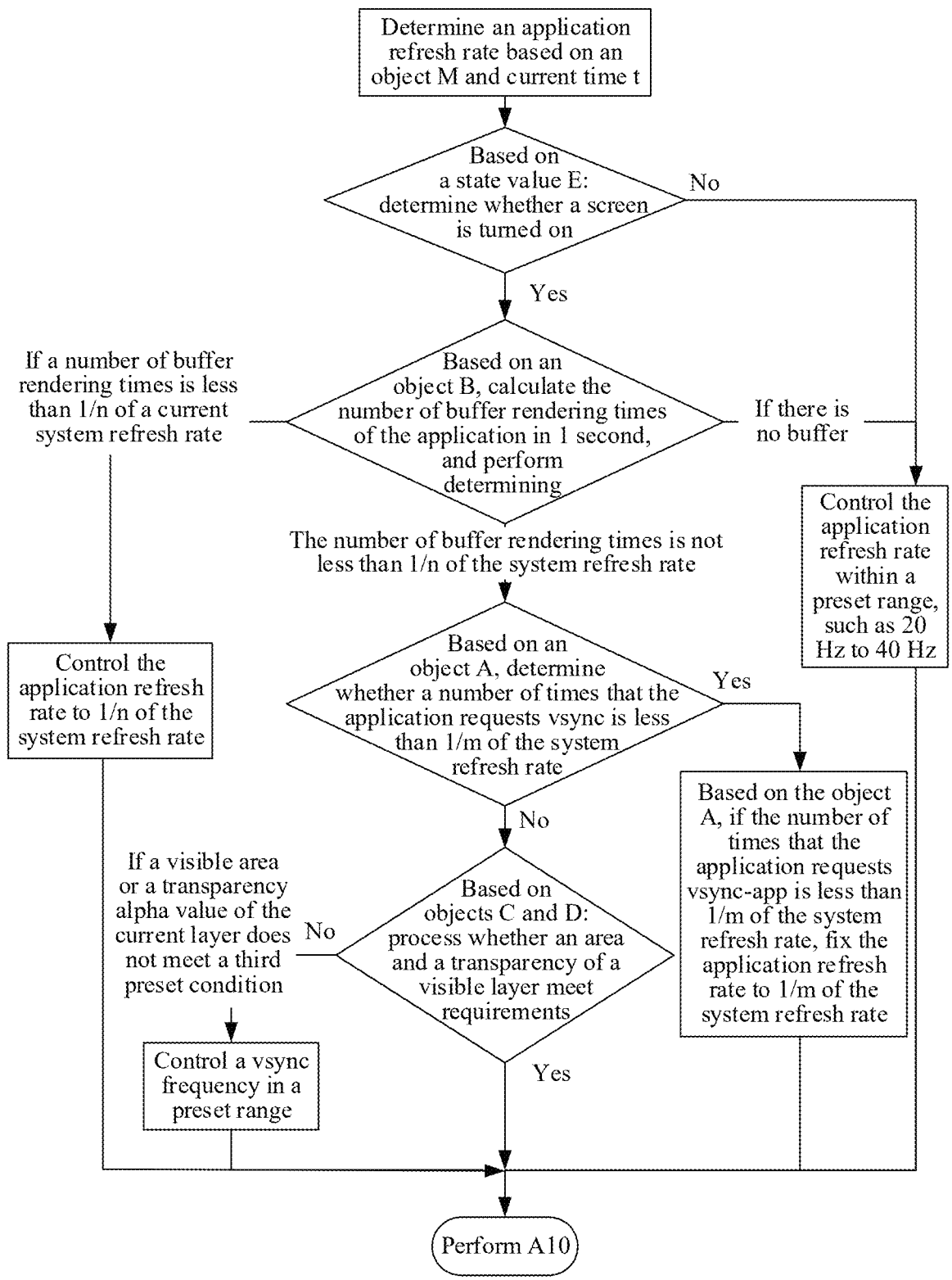
FIG. 7 is a flowchart of a request parameter determining method according to an embodiment of the present disclosure.

Specifically, FIG. 7 shows a flow of deciding whether to send the Vsync signal based on the historical map data according to an embodiment of the present disclosure, that is, the step of determining request parameters. The step A91 may further includes the following steps:

1. The synthesis system determines a time interval between the object M and the current time t based on the object M and the current time t, determines the application refresh rate according to the time interval, so as to adjust the application refresh rate later.

2. The synthesis system determines whether the screen of the current terminal is turned off based on the state value E. If yes, the application refresh rate is controlled in a preset range, and the step A10 is to be executed.

If there are QQ music and other applications, and the applications are of 120 Hz when being used in a foreground, the UI and the rendering thread of the application still work at the frequency of 120 Hz after the screen is turned off, which will lead to high power consumption of the device. At this time, if the screen is turned off, the application refresh rate can be directly reduced and controlled in the preset range.

3. If the screen of the current terminal is not turned off, the number of times (i.e., the number of rendering times) that the rendering thread of the application renders the buffer in 1 s is calculated based on object B, and determining is performed. If no buffer is generated, the foregoing step 2 is to be executed. If the number of buffer rendering times is less than 1/n of the system refresh rate, the application refresh rate is controlled to 1/n of the system refresh rate, and the step A10 is to be executed.
4. If the number of buffer rendering times is not less than 1/n of the current system refresh rate, whether the number of request times that the application sends the Vsync signal request message is less than 1/m of the system refresh rate is determined based on the object A. If the determining is performed based on the object A, the application refresh rate is adjusted to be 1/m of the system refresh rate, and the step A10 is to be executed.
5. If the number of request times that the application sends the Vsync signal request message is not less than 1/m of the system refresh rate, whether the area and transparency of the current image frame meet requirements are determined based on the object C and the object D. If yes, the step A10 is to be executed. Otherwise, the Vsync signal transmission frequency is controlled within a preset range by setting the timer, and then the step A10 is to be executed.

As a specific example, if visible area of the current image frame is less than ⅓ of the area of the terminal screen, or the transparency alpha value of the same is less than 0.5, it means that the current layer parameter does not meet the requirement, the Vsync thread adjusts the Vsync signal transmission frequency to be lower than the system refresh rate.

It should be noted that specific values shown in FIG. 7 are examples, and are not limited as the only embodiment of the present disclosure. For example, in the process of determining the area and transparency of the current image frame, whether the scaling factor belongs to the preset list of perceivable application layers can be further determined.

Figure 8:
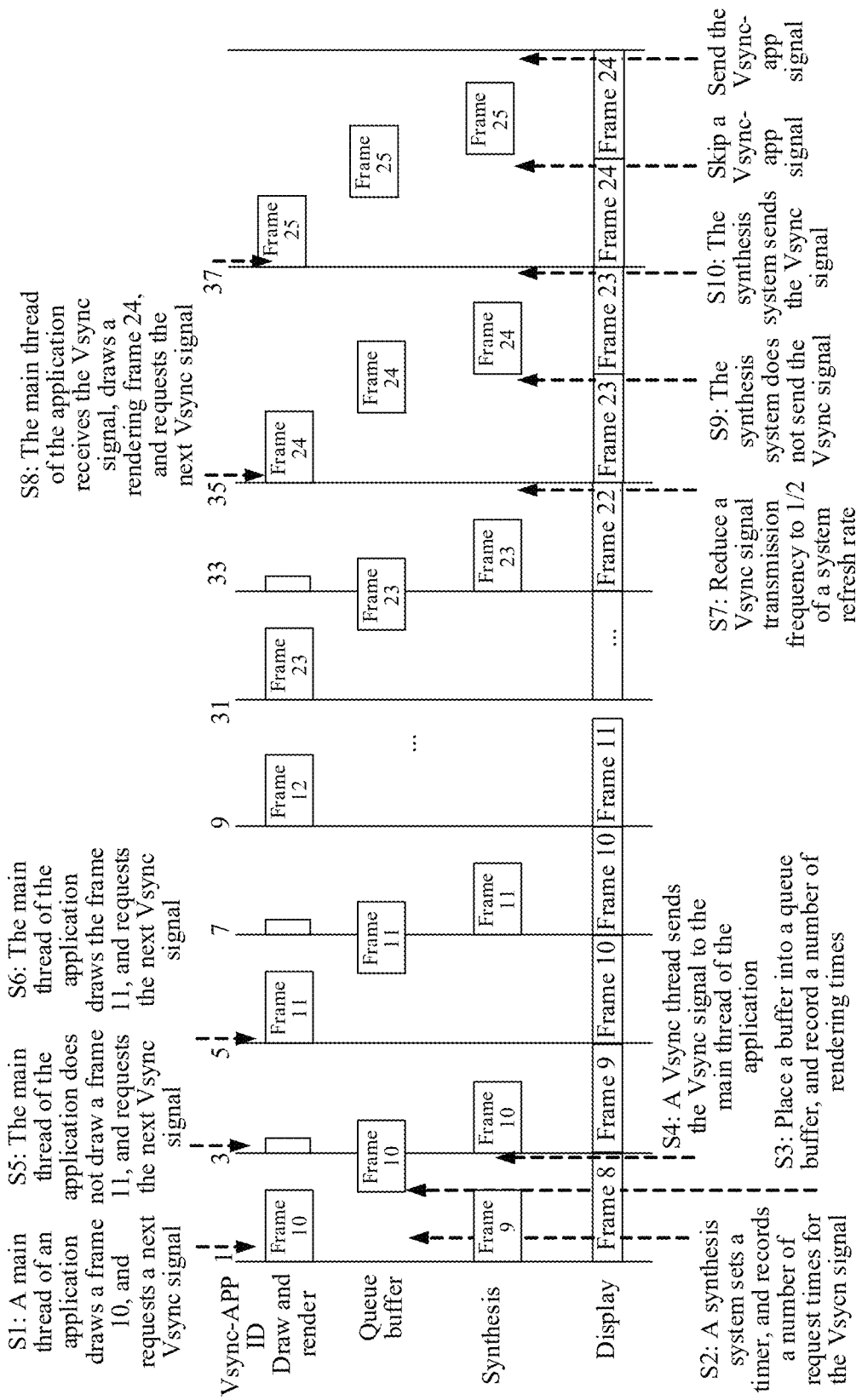
FIG. 8 is a schematic diagram of a Vsync signal transmission frequency switching process of a Vsync thread according to an embodiment of the present disclosure.

As a specific example, FIG. 8 shows a schematic process of switching the Vsync signal transmission frequency of the Vsync thread according to an embodiment of the present disclosure.

As shown in FIG. 8, the method for controlling a Vsync signal according to the embodiment of the present disclosure may include the following:

S1: The main thread of the application draws a current image frame, i.e., frame 10, and requests a next Vsync signal request message from the synthesis system.
S2: The Vsync thread in the synthesis system receives the Vsync signal request message sent by the main thread of the application, sets a next timer for triggering a next Vsync-app event, and meanwhile, records the number of request times that the main thread of the application sends the Vsync signal request message.
S3: The frame 10 is rendered and drawn, and formed rendering buffer data is put into the queue buffer of the synthesis system. The synthesis system records the number of buffers rendered by the application, which is used to determine the number of rendering times of the rendering thread in unit time.
S4: The Vsync thread of the synthesis system sends the Vsync signal to the main thread of the application.
S5: When the next timer set in S2 expires (Vsync-APP, ID3), the synthesis system synthesizes the frame 10, displays a historical frame 9, and sends the next Vsync signal request message, to request the next Vsync signal for rendering and drawing a frame 11.
S6: After receiving the Vsync signal sent by the Vsync thread (Vsync-APP, ID5), the main thread of the application draws and renders the frame 11, and requests the next Vsync signal.
S7: After the foregoing steps are cyclically executed for a period of time, the synthesis system calculates that the number of rendering times of the rendering thread of the application in unit time is less than ½ of the system refresh rate, adjusts the Vsync signal transmission frequency of the Vsync thread, reduces the frequency at which the Vsync thread sends the Vsync signal to the main thread of the application to ½ of the system refresh rate, and records Vsync signal transmission time.
S8: After receiving the Vsync signal sent by the Vsync thread (Vsync-APP, ID34), the main thread of the application draws and renders a frame 24, and requests the next Vsync signal.
S9: At a time point when the next Vsync signal should arrive determined based on the system refresh rate, the synthesis system calculates a difference between the time point and the time point at which the Vsync signal was sent last time. If the difference is less than the length of a frame period corresponding to ½ of the system refresh rate, the Vsync signal is not sent at the current time, and the timer is set to trigger the next Vsync-APP signal.
S10: When the next time expires, the synthesis system calculates a time difference between the current time and Vsync signal transmission time in S7, which is not less than the length of the frame period corresponding to ½ of the system refresh rate, the Vsync signal is sent by the Vsync thread at the current time, so as to achieve the adjustment of the Vsync signal transmission frequency.

Figure 9:
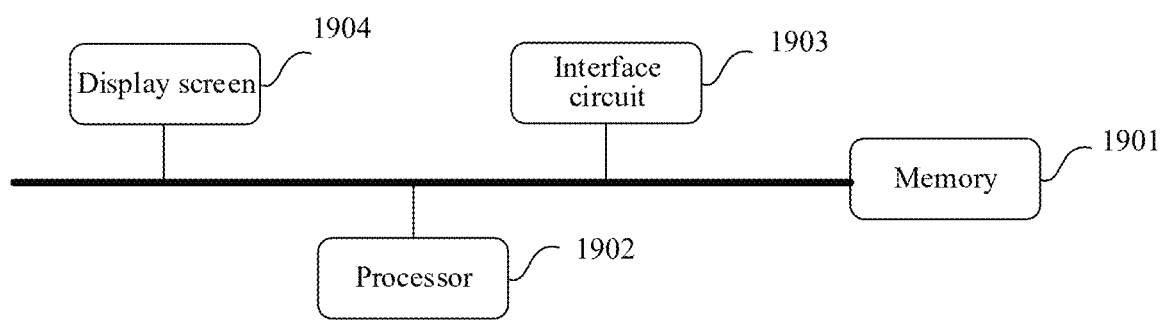
FIG. 9 is a schematic diagram of a hardware structure of a data processing apparatus according to an embodiment of the present disclosure.

As shown in FIG. 9, which is a schematic structural diagram of hardware of a data processing apparatus according to an embodiment of the present disclosure.

As shown in FIG. 9, the apparatus includes: a memory 1901, a processor 1902, and an interface circuit 1903. The apparatus may further include a display screen 1904. The memory 1901, the processor 1902, the interface circuit 1903, and the display screen 1904 may perform communication. Exemplarily, the memory 1901, the processor 1902, the interface circuit 1903, and the display screen 1904 may perform communication through a communication bus. The memory 1901 is configured to store computer-executable instructions, executed by the processor 1902. In addition, the interface circuit 1903 performs communication, to implement the data processing method provided in the embodiment of the present disclosure.

Optionally, the interface circuit 1903 may further include a transmitter and/or a receiver. Optionally, the processor 1902 may include one or more CPUs, or may be another general-purpose processor, a digital signal processor (digital signal processor, DSP), an application specific integrated circuit (application specific integrated circuit, ASIC), or the like. The general-purpose processor may be a microprocessor, or the processor may be any conventional processor and the like. Steps of the methods disclosed with reference to the present disclosure may be directly performed and completed by a hardware processor, or may be performed and completed by using a combination of hardware and a software module in the processor.

The data processing apparatus as shown in FIG. 9 provided in the embodiment of the present disclosure is configured to perform the data processing method in the foregoing embodiment. Their technical principles and technical effects are similar, and details are not described herein again.

An embodiment of the present disclosure provides an electronic device, and the structure of which is shown in FIG. 1. A memory of the electronic device may be configured to store at least one program instruction, and a processor is configured to execute the at least one program instruction, to implement the technical solutions of the foregoing method embodiment. Their implementation principles and technical effects are similar those in the method-related embodiments, and details are not described herein again.

An embodiment of the present disclosure provides a chip. The chip includes a processor, and the processor is configured to invoke a computer program in a memory to perform the technical solutions in the foregoing embodiments. Their implementation principles and technical effects are similar those in the related embodiments, and details are not described herein again.

An embodiment of the present disclosure provides a computer program product, and when the computer program product runs on an electronic device, the terminal device performs the technical solutions in the foregoing embodiments. Their implementation principles and technical effects are similar those in the related embodiments, and details are not described herein again.

An embodiment of the present disclosure provides a computer-readable storage medium, storing program instructions. The program instructions, when executed by a terminal device, causes the terminal device to perform the technical solutions in the foregoing embodiments. Their implementation principles and technical effects are similar those in the related embodiments, and details are not described herein again.

The embodiments of the present disclosure are described with reference to the flowcharts and/or block diagrams of the method, the device (system), and the computer program product according to the embodiments of the present disclosure. It should be understood that each flow and/or block in the flow diagrams and/or block diagrams and combinations of the flows and/or blocks in the flow diagrams and/or block diagrams can be implemented by the computer program instructions. These computer program instructions may be provided for a general-purpose computer, a dedicated computer, an embedded processor, or a processing unit of any other programmable data processing device to generate a machine, so that the instructions executed by a computer or a processing unit of any other programmable data processing device generate an apparatus for implementing a specific function in one or more processes in the flowcharts and/or in one or more blocks in the block diagrams. It would be obvious for those skilled in the art that the present disclosure is not limited to the details of the foregoing exemplary embodiments, and can be achieved in other specific forms without departing from the spirit or essential characteristics of the present disclosure.

Therefore, the embodiments should be considered in all respects as exemplary and not restrictive, and the scope of the present disclosure is defined by the appended claims rather than the foregoing description, so it is intended to encompass in the present disclosure all changes that fall within the meaning and scope of the equivalents of the claims. No reference numerals in the claims should be considered as limitations to the related claims.

Finally, it should be noted that the foregoing embodiments are merely used to illustrate the technical solutions of the present disclosure but not to limit it. Although the present disclosure is described in detail with reference to the preferred embodiments, an ordinary person skilled in the art should understand that the technical solutions of the present disclosure can be modified or replaced by equivalents without departing from the spirit and scope of the technical solutions of the present disclosure.

The invention claimed is:

1. A method for controlling a Vsync signal, applied to an electronic device, wherein the method comprises:
   receiving, by a synthesis system, a Vsync signal request message sent by a main thread of an application;
   after receiving the Vsync signal request message, determining, by the synthesis system, a number of rendering times of a rendering thread of the application in unit time;
   when the number of rendering times of the rendering thread in unit time is equal to a system refresh rate of the electronic device, sending, by a Vsync thread, a Vsync signal to the main thread of the application at a first frequency, wherein the first frequency is equal to the system refresh rate; and
   when the number of rendering times of the rendering thread in unit time is less than the system refresh rate of the electronic device, sending, by the Vsync thread, the Vsync signal to the main thread of the application at a second frequency, wherein the second frequency is less than the system refresh rate.

2. The method according to claim 1, wherein
   the Vsync thread does not send the Vsync signal in at least part of moments, so that the Vsync thread sends the Vsync signal to the main thread of the application at the second frequency; and
   the at least part of moments is a moment that is determined based on the system refresh rate and in which the Vsync signal needs to be sent.

3. The method according to claim 1, wherein
   when the number of rendering times of the rendering thread in unit time is less than 1/n of the system refresh rate, the second frequency is 1/n of the system refresh rate, and n is a positive integer.

4. The method according to claim 1, wherein
   the main thread of the application measures and lays out an image frame;
   when results of the measurement and the layout meet a preset drawing condition, the main thread of the application triggers the rendering thread to draw and render the image frame; and
   when results of the measurement and the layout do not meet the preset drawing condition, the main thread of the application does not trigger the rendering thread.

5. A method for controlling a Vsync signal, applied to an electronic device, wherein the method comprises:
   receiving, by a synthesis system, a Vsync signal request message sent by a main thread of an application;
   after receiving the Vsync signal request message, determining, by the synthesis system, a number of request times that the main thread of the application sends the Vsync signal request message in unit time;
   when the number of request times that the main thread of the application sends the Vsync signal request message in unit time is equal to a system refresh rate of the electronic device, sending, by a Vsync thread, a Vsync signal to the main thread of the application at a third frequency, wherein the third frequency is equal to the system refresh rate; and when the number of request times that the main thread of the application sends the Vsync signal request message in unit time is less than the system refresh rate of the electronic device, sending, by the Vsync thread, the Vsync signal to the main thread of the application at a fourth frequency, wherein the fourth frequency is less than the system refresh rate.

6. The method according to claim 5, wherein the Vsync thread does not send the Vsync signal in at least part of moments, so that the Vsync thread sends the Vsync signal to the main thread of the application at the fourth frequency; and the at least part of moments is a moment that is determined based on the system refresh rate and in which the Vsync signal needs to be sent.

7. The method according to claim 5, wherein when the number of request times that the main thread of the application sends the Vsync signal request message in unit time is less than 1/m of the system refresh rate, the fourth frequency is 1/m of the system refresh rate, and m is a positive integer.

8. An electronic device, comprising at least one processor; and a memory and a display screen communicatively connected to the at least one processor, wherein the display screen is configured to display an application interface; and he memory stores instructions executable by the at least one processor, and the instructions, when executed by the at least one processor, cause the at least one processor to perform steps of the method for controlling a Vsync signal according to claim 1.

* * * * *